US009850114B2

(12) United States Patent
Gilland et al.

(10) Patent No.: US 9,850,114 B2
(45) Date of Patent: Dec. 26, 2017

(54) BATTERY TRANSFER APPARATUS

(75) Inventors: Jess D. Gilland, New Knoxville, OH (US); Matthew J. Otto, New Bremen, OH (US); Craig J. Rekow, Troy, OH (US); Chad T. Sollmann, Sidney, OH (US); Gary L. Topp, New Bremen, OH (US)

(73) Assignee: Crown Equipment Corporation, New Bremen, OH (US)

( * ) Notice: Subject to any disclaimer, the term of this patent is extended or adjusted under 35 U.S.C. 154(b) by 147 days.

(21) Appl. No.: 13/486,032

(22) Filed: Jun. 1, 2012

(65) Prior Publication Data

US 2012/0315117 A1   Dec. 13, 2012

Related U.S. Application Data

(60) Provisional application No. 61/494,012, filed on Jun. 7, 2011.

(51) Int. Cl.
*B66F 9/075* (2006.01)
*B60S 5/06* (2006.01)

(52) U.S. Cl.
CPC ............ *B66F 9/0754* (2013.01); *B60S 5/06* (2013.01); *B62B 2203/74* (2013.01)

(58) Field of Classification Search
CPC ......... B60P 1/52; B60P 3/1066; B60P 3/1075; B65G 13/12; B65G 67/20; B60S 5/06;
(Continued)

(56) References Cited

U.S. PATENT DOCUMENTS 1,566,089 A    12/1925  Harding
2,432,182 A *  12/1947  Turner ................... B66F 9/195
                                                    108/57.15

(Continued)

FOREIGN PATENT DOCUMENTS

CN         2330637 Y      7/1999
CN      101602474 A      12/2009
(Continued)

OTHER PUBLICATIONS

Rupcic, Zoran; International Search Report and Written Opinion; Application No. PCT/US2012/040343; dated Aug. 10, 2012; European Patent Office.

(Continued)

*Primary Examiner* — Glenn Myers
(74) *Attorney, Agent, or Firm* — Stevens & Showalter, LLP

(57) ABSTRACT

A battery transfer apparatus for loading/unloading batteries from materials handling vehicles includes a mobile unit and a battery stand. The mobile unit is used to transport batteries into/out of materials handling vehicles and includes load handling structure comprising at least one roller, which is used to roll batteries into/out of materials handling vehicles. A top wall of the battery stand includes at least one opening and support structure of the battery stand engages a surface so as to support the battery stand thereon. The battery stand is engaged by the mobile unit during battery transfer operations by inserting the roller(s) up through the opening(s) in the top wall of the battery stand such that the roller(s) can engage the battery through the opening(s). The battery stand is capable of storing the battery while the battery is out of the materials handling vehicle.

37 Claims, 26 Drawing Sheets

(58) Field of Classification Search
CPC .............. B66F 9/0754; B62B 2202/61; B62B 2203/74; B62B 5/0053; B60L 11/1822; H01M 2/1005; H01M 2/1072; H01M 2/1077; H01M 2/1083; B60K 1/04; B60K 2001/0461; B60K 2001/0477; B60K 2001/0455; B60K 2001/0483; B60K 2001/0494
USPC ....... 414/535, 340, 345, 390, 395, 400, 347, 414/392; 320/109, 113; 294/903
See application file for complete search history.

(56) References Cited

U.S. PATENT DOCUMENTS

| | | | |
|---|---|---|---|
| 3,259,365 A | 7/1966 | Gibson | |
| 3,791,544 A * | 2/1974 | Moses | B66F 9/19 414/607 |
| 3,834,563 A | 9/1974 | Teti | |
| 4,055,260 A | 10/1977 | Tamas | |
| 4,101,038 A | 7/1978 | Palma | |
| 4,120,411 A * | 10/1978 | Johnson | 414/351 |
| 4,227,463 A * | 10/1980 | Pfleger | 104/34 |
| 4,283,164 A * | 8/1981 | Reaney | 414/396 |
| 4,450,400 A | 5/1984 | Gwyn | |
| 4,459,732 A | 7/1984 | Driggers | |
| 4,808,058 A | 2/1989 | Carney et al. | |
| 4,930,612 A * | 6/1990 | Thorndyke | B65G 13/12 193/35 SS |
| 5,297,645 A | 3/1994 | Eckersley et al. | |
| 5,360,307 A | 11/1994 | Schemm et al. | |
| 5,399,061 A | 3/1995 | Grumblatt | |
| 5,425,159 A | 6/1995 | Kluttermann | |
| 5,508,597 A | 4/1996 | Parmley, Sr. | |
| 5,545,967 A | 8/1996 | Osborne et al. | |
| 5,711,648 A | 1/1998 | Hammerslag | |
| 6,345,677 B1 | 2/2002 | Eckersley et al. | |
| 6,357,070 B1 | 3/2002 | Venard et al. | |
| 6,637,807 B2 | 10/2003 | Gotz | |
| 6,732,825 B2 | 5/2004 | Takeda | |
| 6,896,468 B2 | 5/2005 | Gallea et al. | |
| 7,163,088 B2 | 1/2007 | Jahns et al. | |
| 7,175,379 B2 * | 2/2007 | Sellhorn et al. | B60L 11/1822 187/237 |
| 7,258,184 B2 * | 8/2007 | Shorney et al. | 180/68.5 |
| 7,338,248 B2 | 3/2008 | Buchmann et al. | |
| 7,712,563 B2 | 5/2010 | Niebuhr | |
| 7,828,099 B2 | 11/2010 | Heckeroth | |
| 7,938,612 B2 * | 5/2011 | Springston | B60S 5/06 414/347 |
| 2002/0070092 A1 * | 6/2002 | Ransil | B65G 13/12 193/37 |
| 2004/0173408 A1 | 9/2004 | Szymanski et al. | |
| 2005/0008465 A1 | 1/2005 | Szymanski et al. | |
| 2005/0036861 A1 * | 2/2005 | Buchmann et al. | 414/398 |
| 2005/0278920 A1 | 12/2005 | Bogelein | |
| 2006/0232030 A1 | 10/2006 | Passeri | |
| 2009/0020368 A1 | 1/2009 | Bogelein et al. | |
| 2009/0067967 A1 * | 3/2009 | Springston et al. | 414/542 |
| 2009/0139940 A1 * | 6/2009 | Maniscalco et al. | 211/1.57 |
| 2009/0288898 A1 * | 11/2009 | Boegelein et al. | 180/68.5 |
| 2009/0291358 A1 * | 11/2009 | Boegelein et al. | 429/100 |
| 2012/0068664 A1 * | 3/2012 | Franzen et al. | 320/109 |

FOREIGN PATENT DOCUMENTS

| | | | |
|---|---|---|---|
| CN | 201424046 Y | 3/2010 | |
| CN | 201457439 U | 5/2010 | |
| DE | 2444711 | 4/1976 | |
| DE | 3839618 A1 | 5/1990 | |
| DE | 19956623 A1 | 6/2001 | |
| DE | 10347065 A1 | 5/2005 | |
| DE | 102004056624 A1 | 6/2006 | |
| DE | 102005022094 A1 | 11/2006 | |
| DE | 102006002635 A1 | 7/2007 | |
| DE | 102007025332 A1 | 12/2008 | |
| DE | 102008004653 A1 | 4/2009 | |
| DE | 102008004651 A1 | 7/2009 | |
| EP | 0030928 A1 * | 6/1981 | ............... B60K 1/04 |
| EP | 1095831 A2 | 5/2001 | |
| EP | 1641059 A2 | 3/2006 | |
| EP | 2123526 A2 | 11/2009 | |
| GB | 2317872 A | 4/1998 | |
| JP | 11246193 A | 9/1999 | |
| JP | 2002362263 A | 12/2002 | |
| JP | 2003095591 A | 4/2003 | |
| JP | 2004262632 A | 9/2004 | |
| SE | 7910219 A | 3/1986 | |
| WO | 2009068880 A1 | 6/2009 | |

OTHER PUBLICATIONS

Rupcic, Zoran; Examination Report; Application No. 12727006.4; dated Apr. 15, 2015; European Patent Office.
Luo Liuli, First Office Action and Search Report for counterpart Chinese Patent Application No. 201280027775.7, dated Mar. 30, 2015, State Intellectual Property Office of the People's Republic of China.

* cited by examiner

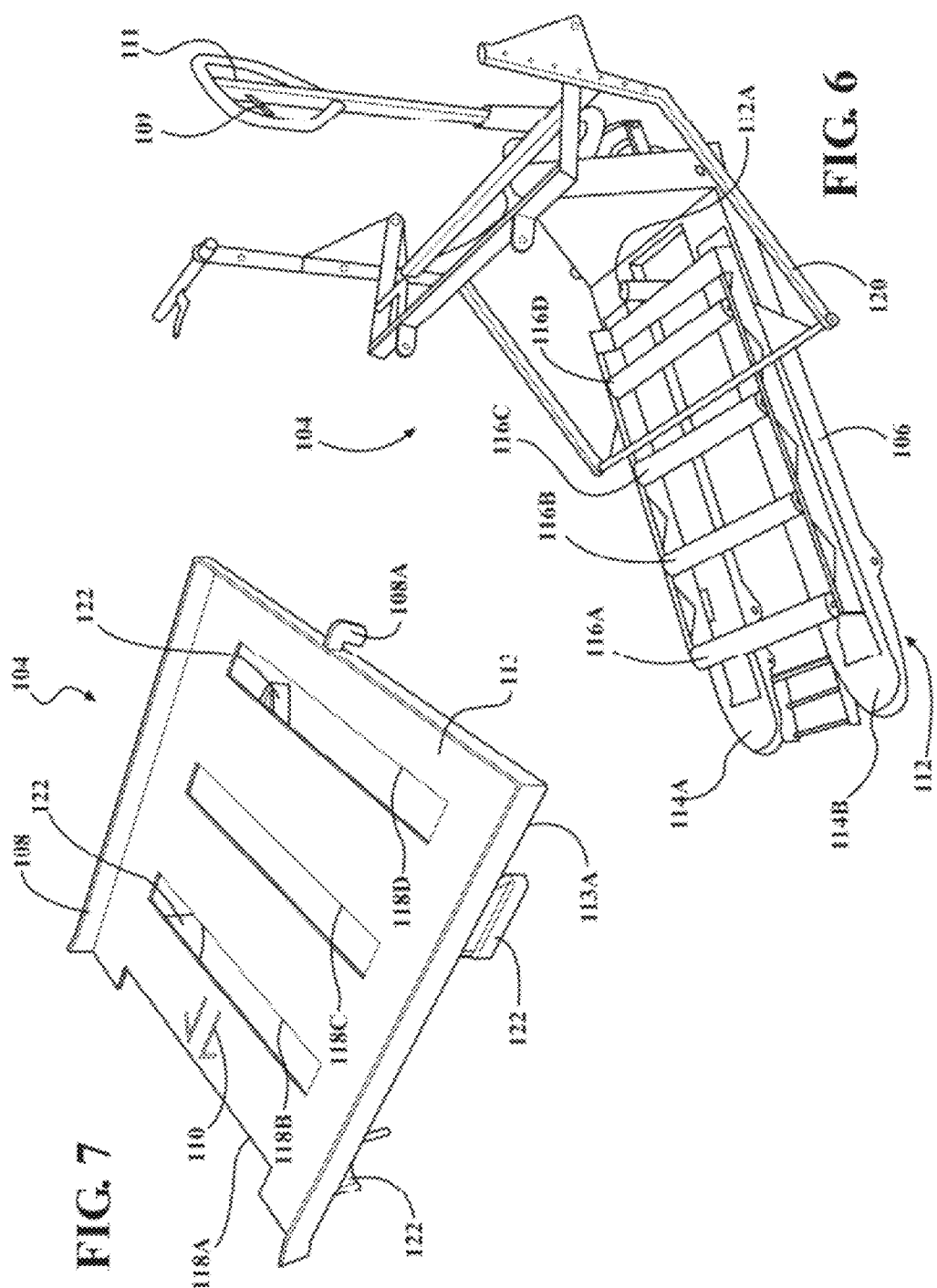

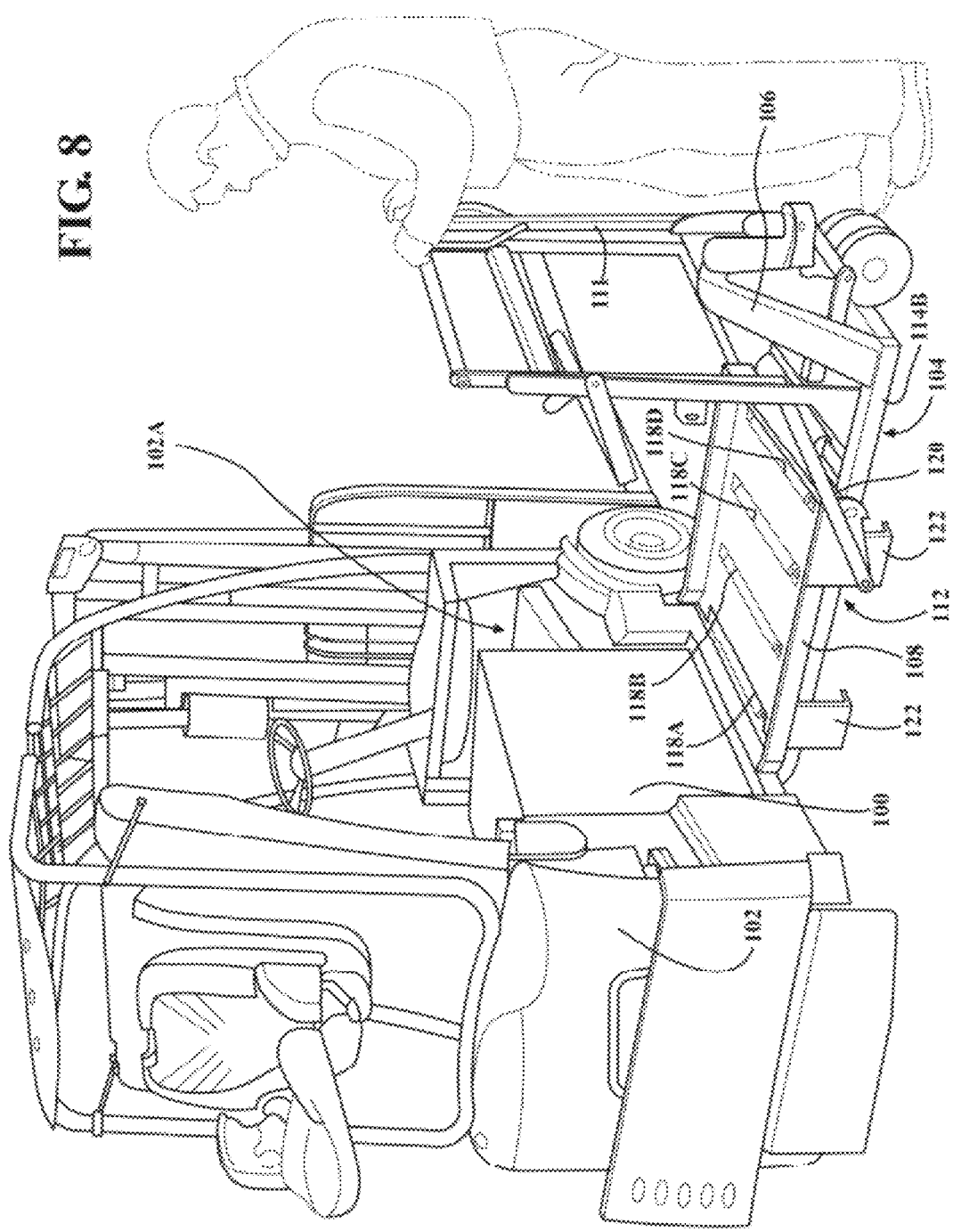

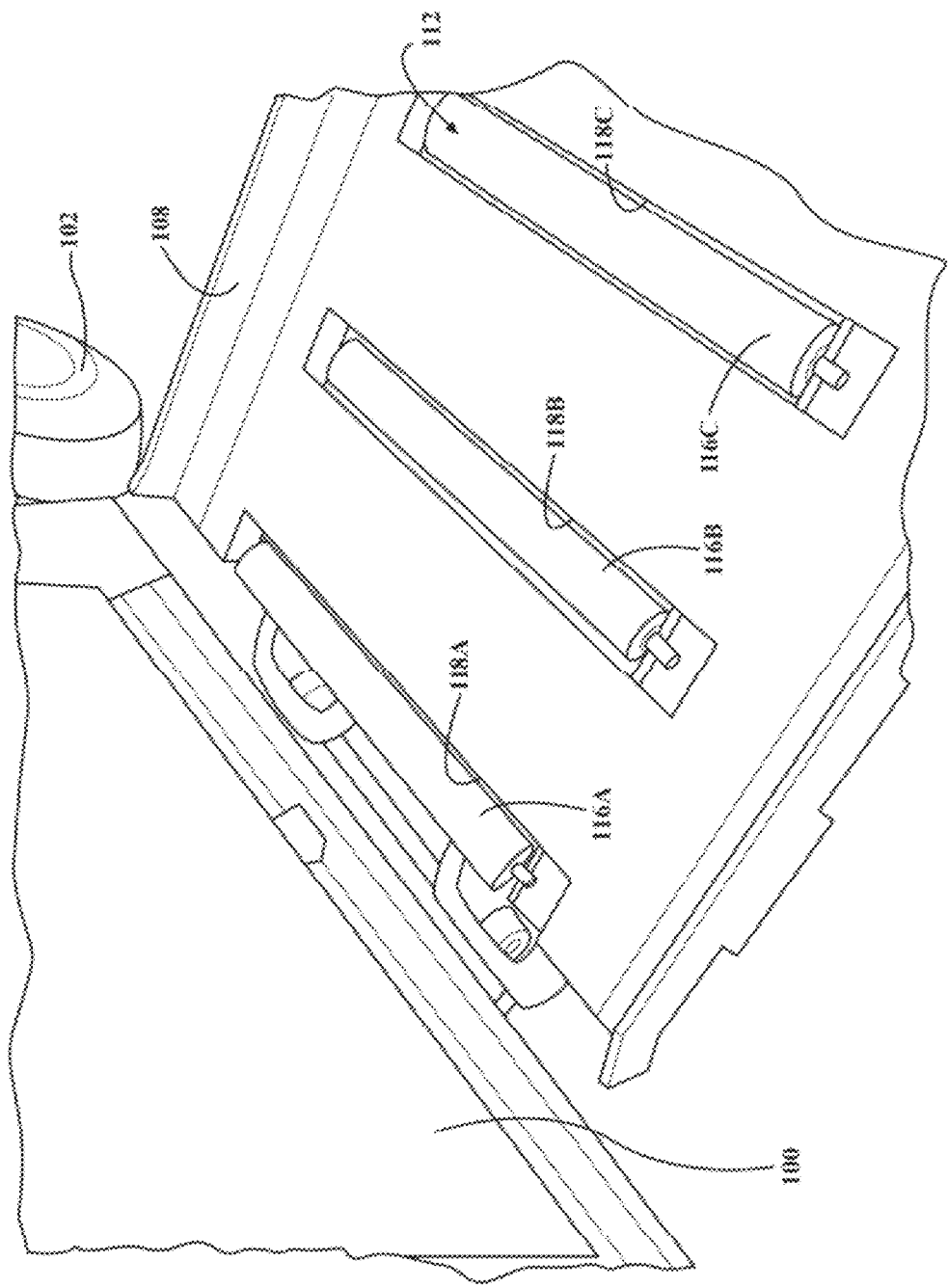

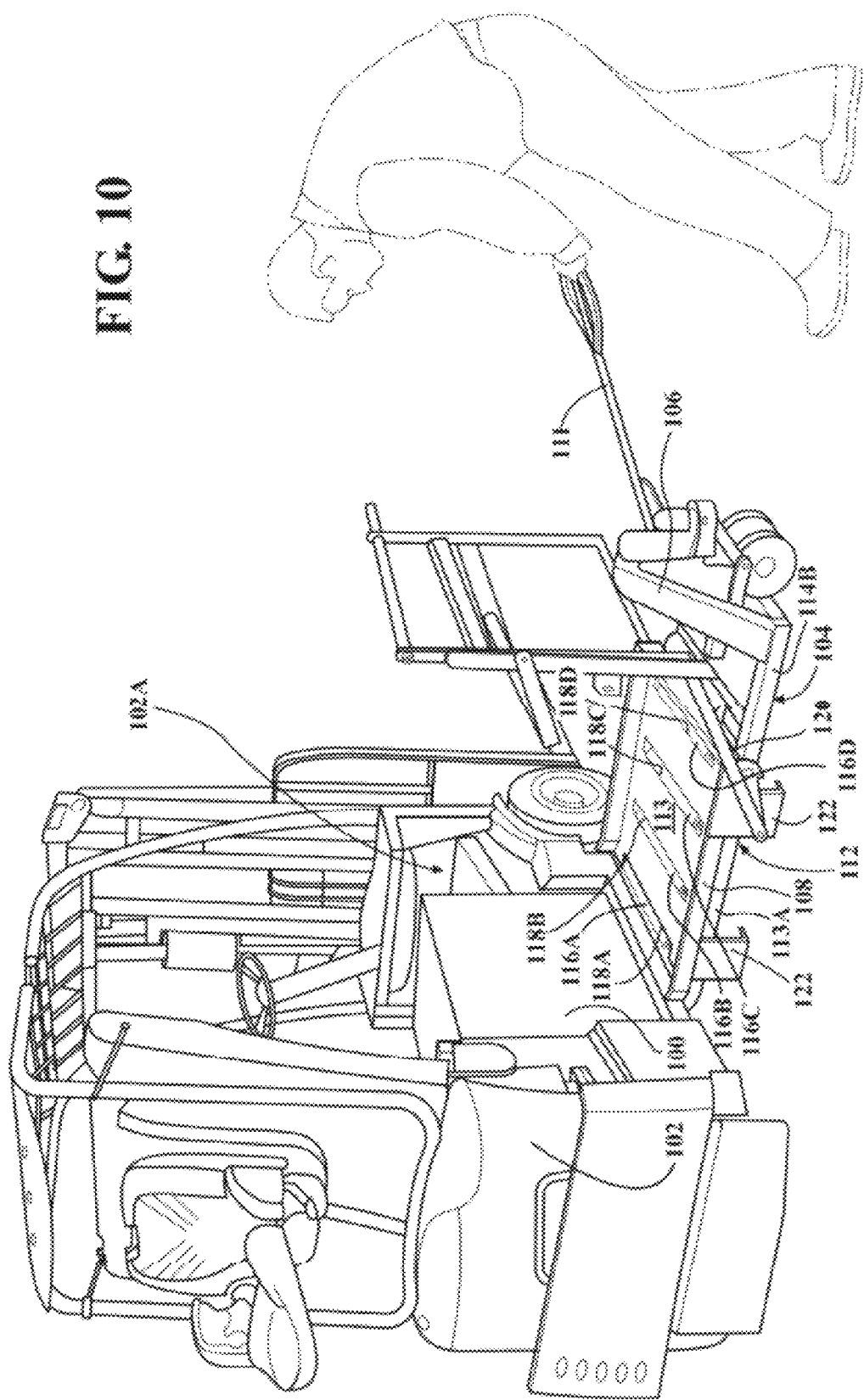

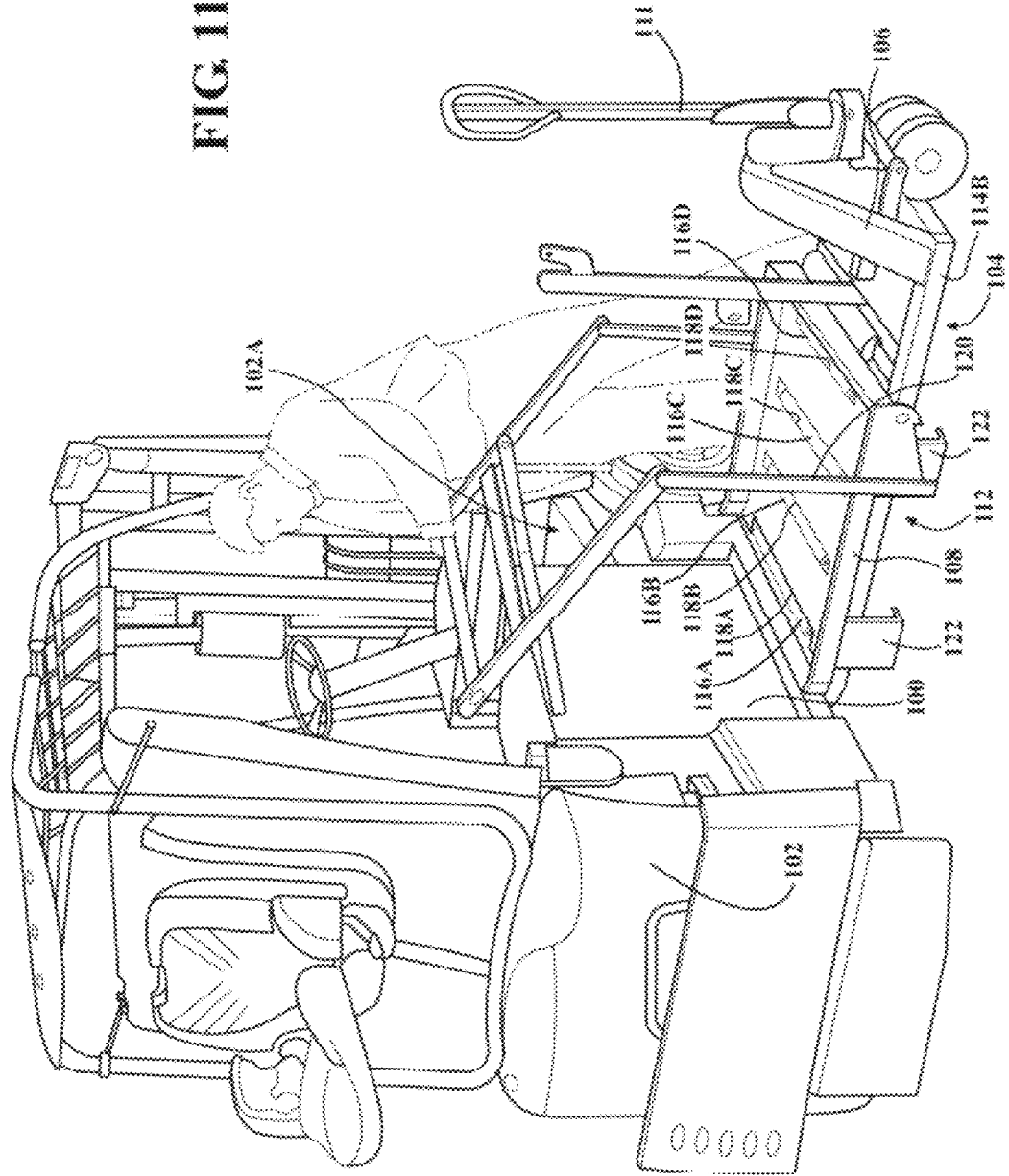

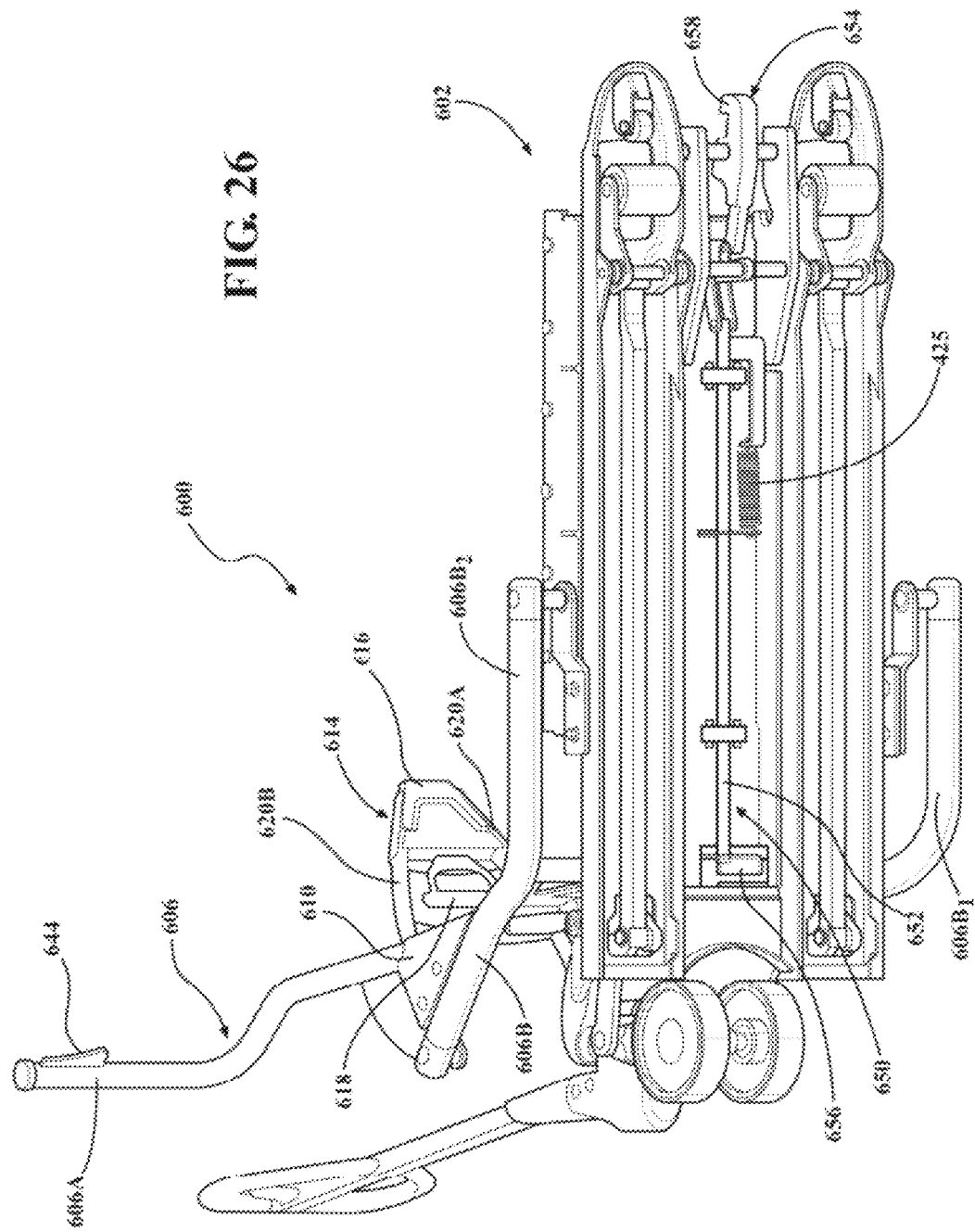

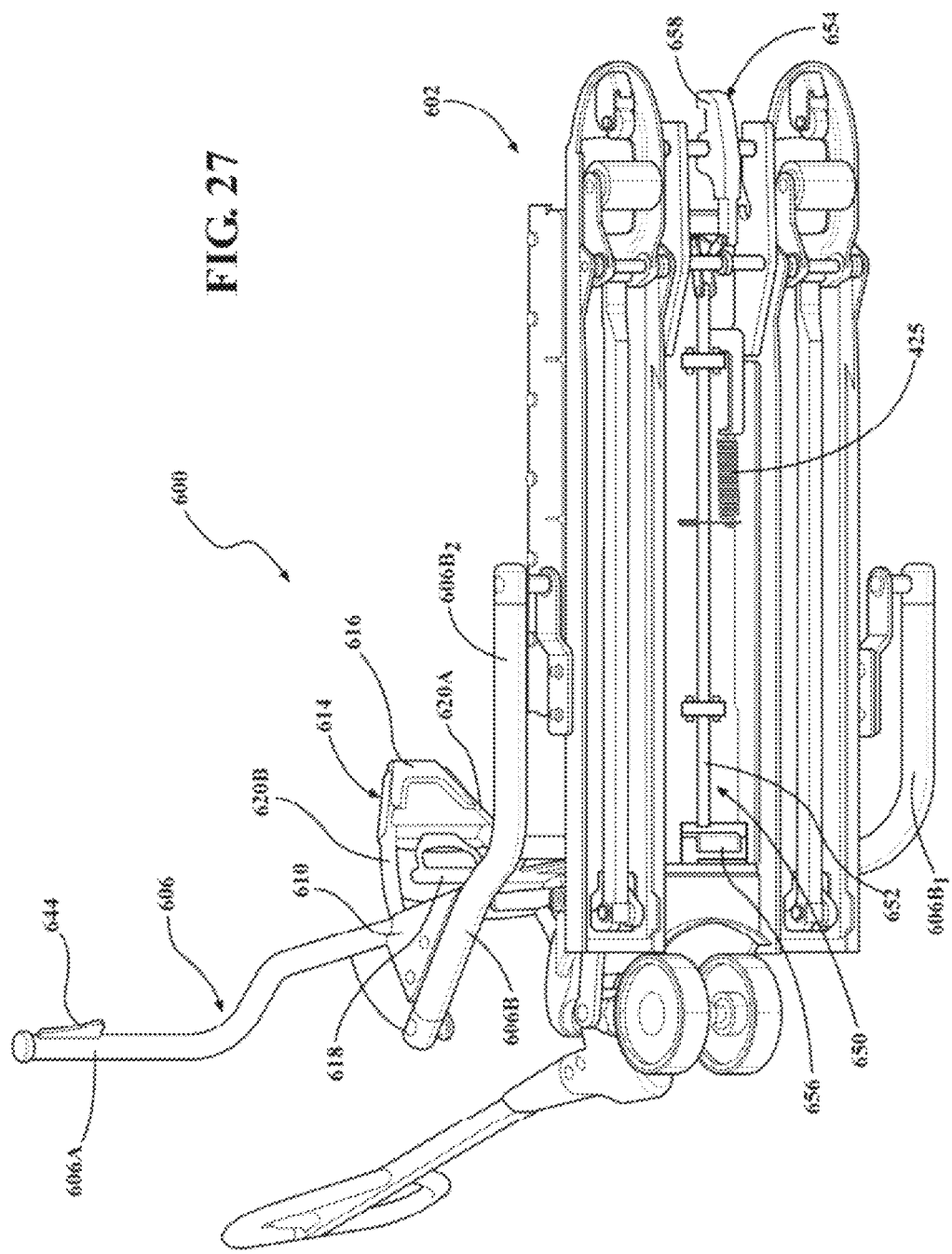

BATTERY TRANSFER APPARATUS

CROSS REFERENCE TO RELATED APPLICATIONS

This application claims the benefit of U.S. Provisional Patent Application Ser. No. 61/494,012, filed Jun. 7, 2011, entitled "BATTERY TRANSFER APPARATUS," the entire disclosure of which is hereby incorporated by reference herein.

FIELD OF THE INVENTION

The present invention relates to a battery transfer apparatus for loading and unloading batteries from materials handling vehicles.

BACKGROUND OF THE INVENTION

Many types of materials handling vehicles, such as forklift trucks, are powered by rechargeable batteries. When the charge on a battery that is used to power a materials handling vehicle is low or depleted, the battery is typically extracted from the vehicle and replaced by a charged battery. The low/depleted battery is then transported to and recharged at a recharging station, rather than recharging the battery while on board the vehicle, as recharging the battery while on board the vehicle requires the vehicle to be out of service during recharging. As batteries that power materials handling vehicle are large and heavy, extracting the batteries from the vehicles can be a difficult and time consuming operation.

BRIEF SUMMARY OF THE INVENTION

The present invention relates to a battery transfer apparatus for loading and unloading batteries from materials handling vehicles.

In accordance with a first aspect of the present invention, a battery transfer apparatus is provided for loading and/or unloading batteries from materials handling vehicles. The battery transfer apparatus comprises a mobile unit and a battery stand. The mobile unit is used for temporarily supporting and transporting the battery that is to be transferred into or out of the materials handling vehicle. The mobile unit comprises load handling structure for supporting the battery. The load handling structure comprises at least one roller that is used to roll the battery into or out of the materials handling vehicle. The battery stand comprises a top wall and support structure. The top wall includes at least one opening and the support structure is adapted to engage a surface upon which the battery stand is placed so as to support the battery stand on the surface. The battery stand is adapted to be engaged by the mobile unit during a transfer of the battery into or out of the materials handling vehicle by inserting the at least one roller up through the at least one opening in the top wall of the battery stand such that the at least one roller can engage the battery through the at least one opening. The battery stand is capable of storing the battery while the battery is out of the materials handling vehicle when the battery stand is disengaged from the load handling structure.

In accordance with a second aspect of the present invention, a system is provided for loading and/or unloading batteries from materials handling vehicles. The system comprises a materials handling vehicle comprising a battery compartment, a battery to be loaded into or unloaded from the battery compartment, and a battery transfer apparatus. The battery transfer apparatus comprises a mobile unit for transporting the battery and a battery stand. The mobile unit comprises load handling structure for temporarily supporting the battery, the load handling structure comprising at least one roller that is used to roll the battery into or out of the materials handling vehicle. The battery stand comprises a top wall and support structure, the top wall including at least one opening and the support structure adapted to engage a surface upon which the battery stand is placed so as to support the battery stand on the surface. The battery stand is adapted to be engaged by the mobile unit during a transfer of the battery into or out of the materials handling vehicle by inserting the at least one roller up through the at least one opening in the top wall of the battery stand such that the at least one roller can engage the battery through the at least one opening. The battery stand is capable of storing the battery while the battery is out of the materials handling vehicle when the battery stand is disengaged from the load handling structure.

BRIEF DESCRIPTION OF THE SEVERAL VIEWS OF THE DRAWINGS

FIGS. 6 and 7 are perspective views of a mobile unit (FIG. 6) and a battery stand (FIG. 7) of a battery transfer apparatus according to another aspect of the present invention;

FIGS. 8-14 illustrate exemplary steps of a method for unloading a battery from a materials handling vehicle and storing the battery with the battery transfer apparatus illustrated in FIGS. 6 and 7;

FIGS. 23-27 are views of battery transfer apparatus according to another embodiment of the invention.

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
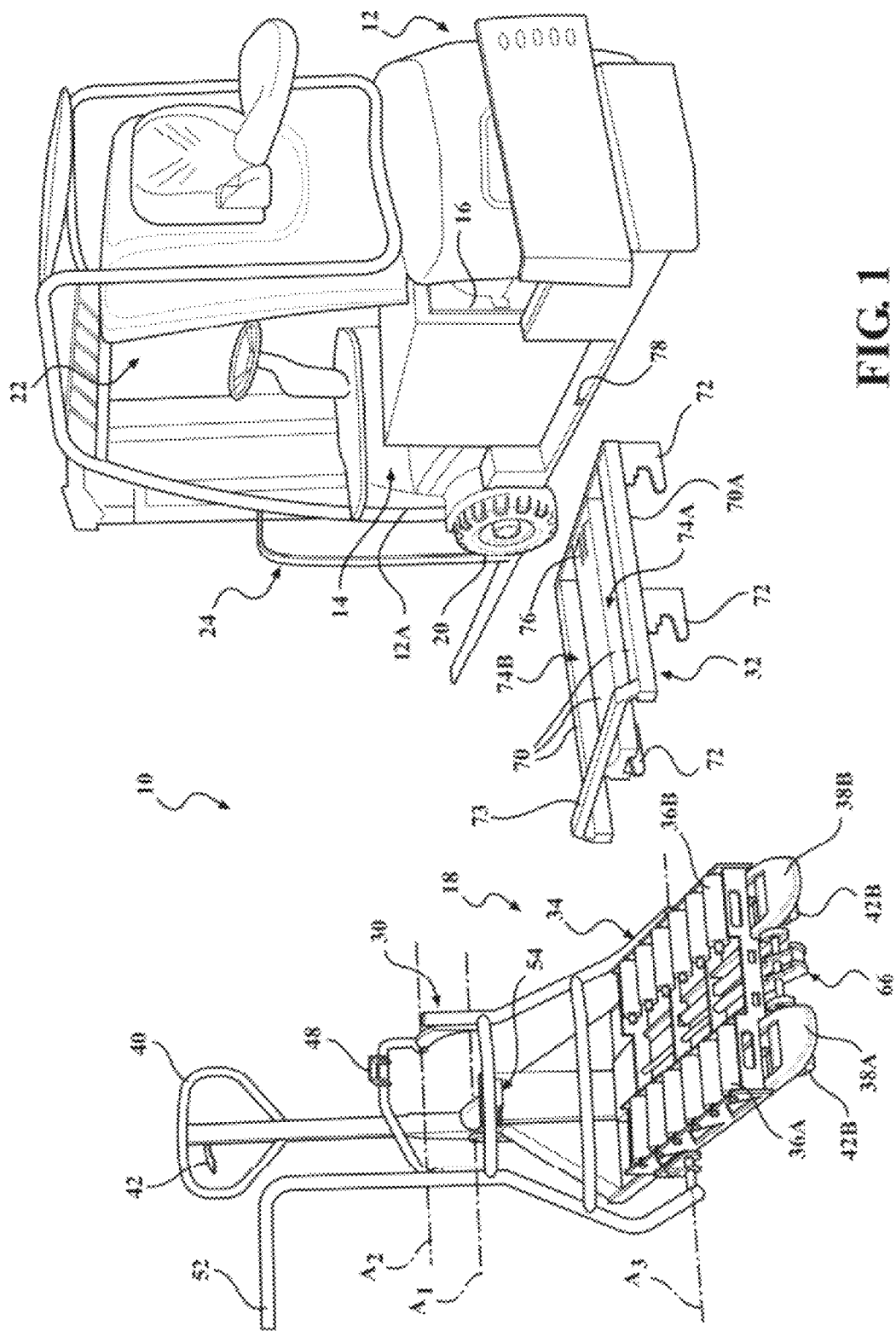
FIG. 1 is a perspective view of a system used for loading and/or unloading batteries from materials handling vehicles according to an aspect of the present invention, the system comprising a battery transfer apparatus, a materials handling vehicle, and a battery.

FIG. 1 illustrates a system 10 used for loading and/or unloading batteries from materials handling vehicles. The system 10 comprises a materials handling vehicle (MHV) 12 having a battery compartment 14, a rechargeable battery 16 to be loaded into and/or unloaded from the battery compartment 14, and a battery transfer apparatus 18. The battery compartment 14 in the embodiment shown is accessible from a side 12A of the MHV 12 and houses the battery 16. The battery compartment 14 comprises conventional rollers (not shown) for rolling the battery 16 into and out of the battery compartment 14. The battery 16 powers the MHV 12 during operation thereof.

The exemplary MHV 12 illustrated in FIG. 1 comprises a plurality of wheels 20 (only one of which is shown in FIG. 1), an operators' compartment 22, and a load handling apparatus 24. The wheels 20, the operator's compartment 22, and the load handling apparatus 24 of the exemplary MHV 12 illustrated in FIG. 1 are conventional and will not be described in detail herein. It is noted that the system 10 is not intended to be limited to the exemplary MHV 12 illustrated in FIG. 1 and could be used in combination with any materials handling vehicle having a rechargeable battery that may be accessible from the side, front, or rear of the vehicle.

Figure 4:
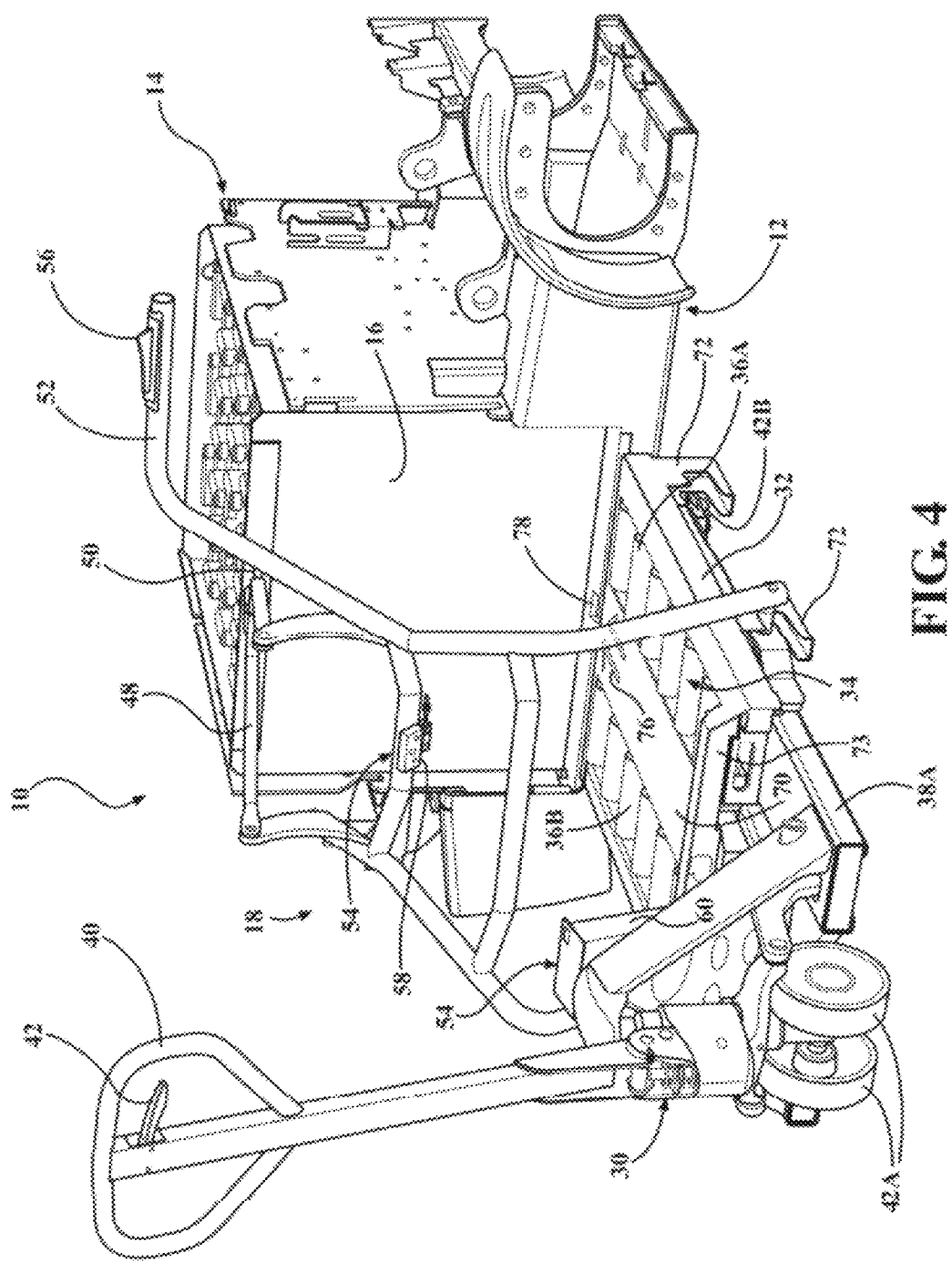
FIG. 4 is a perspective view of the battery transfer apparatus illustrated in FIG. 1 being used to unload a battery from a materials handing vehicle.
Figure 5:
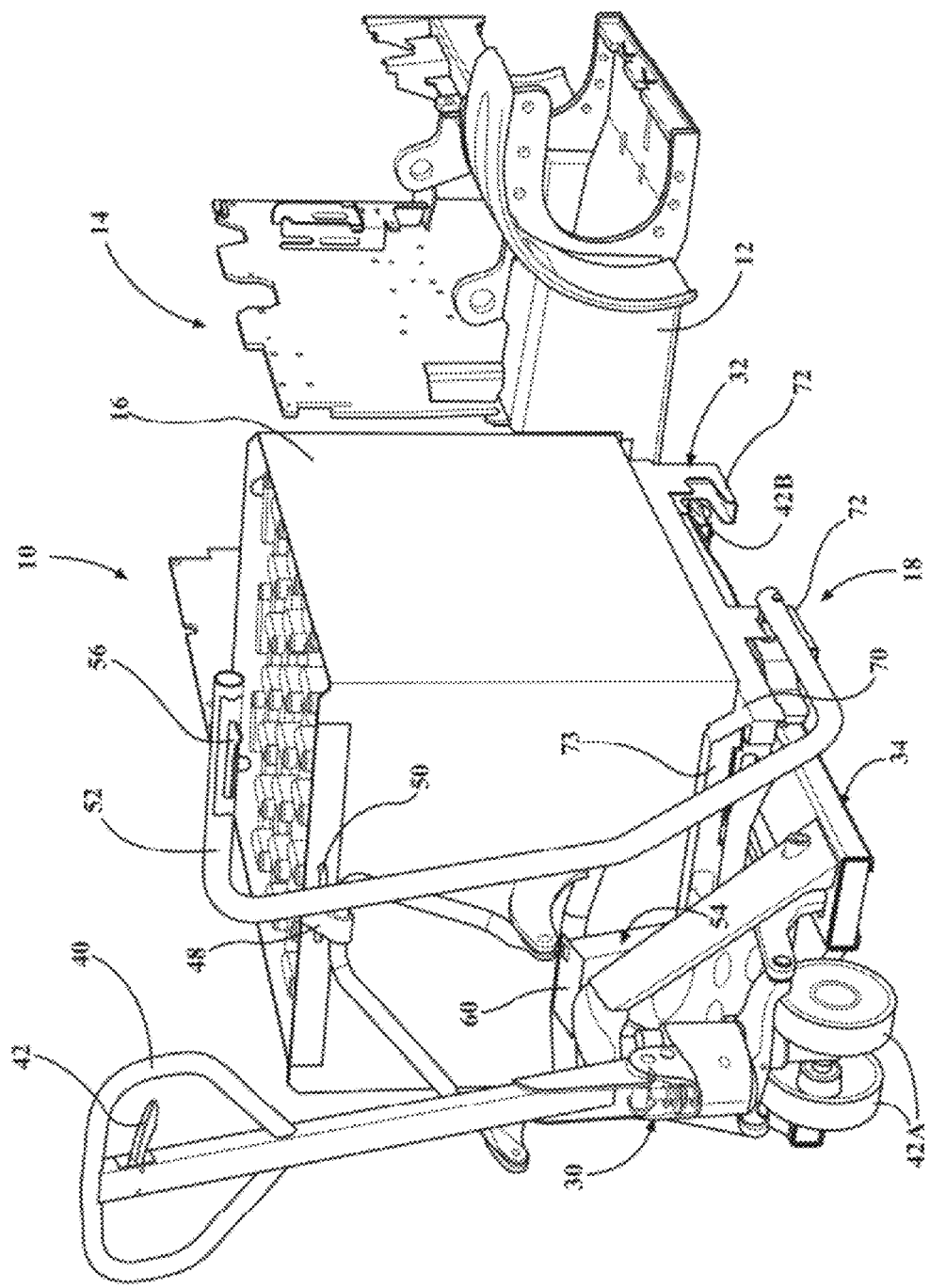
FIG. 5 is a perspective view of the battery transfer apparatus illustrated in FIG. 1 after the battery has been unloaded from the materials handling vehicle.

The battery transfer apparatus 18 according to this embodiment comprises a mobile unit 30 and a battery stand 32, see FIGS. 1, 4, and 5. The mobile unit 30 according to this exemplary embodiment is an unpowered cart, although it is understood that the mobile unit 30 could be powered and could comprise other structures and/or configurations than those shown in FIGS. 1, 2, 4, and 5.

The mobile unit 30 is used for temporarily supporting and transporting the battery 16 during battery transfer operations, i.e., while the battery 16 is being loaded into or unloaded out of the battery compartment 14 of the MHV 12, and while the battery 16 is being moved to a desired location. The mobile unit 30 comprises load handling structure 34 for supporting the battery 16, see also FIGS. 2, and 4. The load handling structure 34 according to this embodiment comprises two sets of rollers 36A, 36B that are supported on respective forks 38A, 38B, but the load handling structure 34 could comprise rollers having other configurations, e.g., as shown in FIG. 6. Preferably, the rollers 36A, 36B are secured to the forks 38A, 38B, but the rollers 36A, 36B could be slidable or adjustably positionable on the forks 38A, 38B for some applications, i.e., the rollers 36A, 36B could be part of a separate roller-carrier unit that is separate from the forks 36A, 36B of the mobile unit 30 but affixed to the forks 36A, 36B for battery transfer operations.

As shown in FIGS. 1, 2, 4, and 5, the mobile unit 30 comprises a handle structure 40 for steering the mobile unit 30 and for being pushed/pulled by an operator to move the mobile unit 30. The handle structure 40 in the embodiment shown is pivotable about a first axis $A_1$, see FIGS. 1 and 2, and can be "pumped" by pivoting the handle structure 40 about the first axis $A_1$ to raise the forks 38A, 38B so as to raise the rollers 36A, 36B. Specifically, pumping the handle structure 40, which may be done repeatedly depending on how high the forks 38A, 38B and rollers 36A, 36B are to be raised, causes hydraulic fluid to flow from a hydraulic fluid reservoir (not shown) provided within the mobile unit 30 to a hydraulic cylinder (not shown) provided within the mobile unit 30 so as to raise the forks 38A, 38B and the rollers 36A, 36B.

The mobile unit 30 includes a lever 42 that is provided on the handle structure 40 in the embodiment shown for ease of use but could be located elsewhere on the mobile unit 30. The lever 42 is movable by the operator to a fork raising position, which enables the handle structure 40 to be pivotable about the first axis $A_1$ such that the handle structure 40 can be pumped to raise the forks 38A, 38B and rollers 36A, 36B, as described above. The lever 42 is also positionable in a fork lowering position and a neutral position. While the lever 42 is positioned in the fork lowering position, the hydraulic fluid is slowly released back into the hydraulic fluid reservoir so as to slowly lower the forks 38A, 38B and the rollers 36A, 36B. While the lever 42 is positioned in the neutral position, the flow of the hydraulic fluid into and out of the hydraulic fluid reservoir is prevented and the handle structure 40 can be pushed/pulled by the operator without raising or lowering the forks 38A, 38B and rollers 36A, 36B. It is noted that the handle structure 40 may be pivoted about the first axis $A_1$ while the lever 42 is in the neutral position without raising or lowering the forks 38A, 38B and rollers 36A, 36B, as will be described herein with reference to the method disclosed in FIGS. 8-14.

The mobile unit 30 also comprises steering wheels 42A (see FIGS. 4 and 5) and load wheels 42B (see FIGS. 1, 2, 4, and 5). The steering wheels 42A are coupled to the handle structure 40 and are used to steer the mobile unit 30. The load wheels 42B are located near the ends of the forks 38A, 38B to support a portion of the weight of a load on the load handling structure 34, e.g., the battery 16. It is noted that the load wheels 42B are located close enough to the ends of the forks 38A, 38B such that when the battery 16 is being loaded onto or off of the rollers 36A, 36B, the battery transfer apparatus 18 is stable so that the steering wheels 42A are not lifted.

As shown in FIGS. 1, 2, 4, and 5, the mobile unit 30 comprises a hook structure 48. The hook structure 48 is pivotable about a second axis $A_2$ (see FIGS. 1 and 2) and is used for engaging and securing the battery 16 to the battery transfer apparatus 18 during battery transfer operations. As shown in FIGS. 4 and 5, the battery 16 may be provided with a bracket 50 that is engageable by the hook structure 48 so as to secure the battery 16 to the battery transfer apparatus 18, although it is noted that the hook structure 48 could directly engage the body of the battery 16, i.e., without the use of the bracket 50.

The hook structure 48 in the embodiment shown is coupled to an extractor assembly 52, as shown in FIGS. 1, 2, 4, and 5. The extractor assembly 52 is affixed to the mobile unit 30 and is pivotable about a third axis $A_3$, see FIGS. 1 and 2. The extractor assembly 52 is adapted to be grasped by an operator and pushed or pulled to move the battery 16 into or out of the battery compartment 14 of the MHV 12. For example, once the battery transfer apparatus 18 is properly positioned for an unloading operation (proper positioning of the battery transfer apparatus 18 will be described in detail below), the extractor assembly 52 is pushed or pulled by the operator and pivoted about the third axis $A_3$ (in a clockwise direction as the mobile unit is shown in FIGS. 1, 2, 4, and 5) until the hook structure 48 is close enough for engagement with the battery bracket 50. The hook structure 48 is then pivoted about the second axis $A_2$ and is engaged with the battery bracket 50 to secure the battery transfer apparatus 18 to the battery 16. Thereafter, the extractor assembly 52 is pushed or pulled by the operator and pivoted about the third axis $A_3$ (in a counter-clockwise direction as the mobile unit is shown in FIGS. 1, 2, 4, and 5), which causes the battery 16 to roll out of the battery compartment 14 of the MHV 12 on the rollers provided in the battery compartment 14. The battery 16 rolls from the rollers in the battery compartment 14 of the MHV 12 onto the sets of rollers 36A, 36B of the mobile unit 30 and is unloaded from the MHV 12. More specific details in connection with a battery unloading operation will be described below with reference to FIGS. 8-14.

Figure 2:
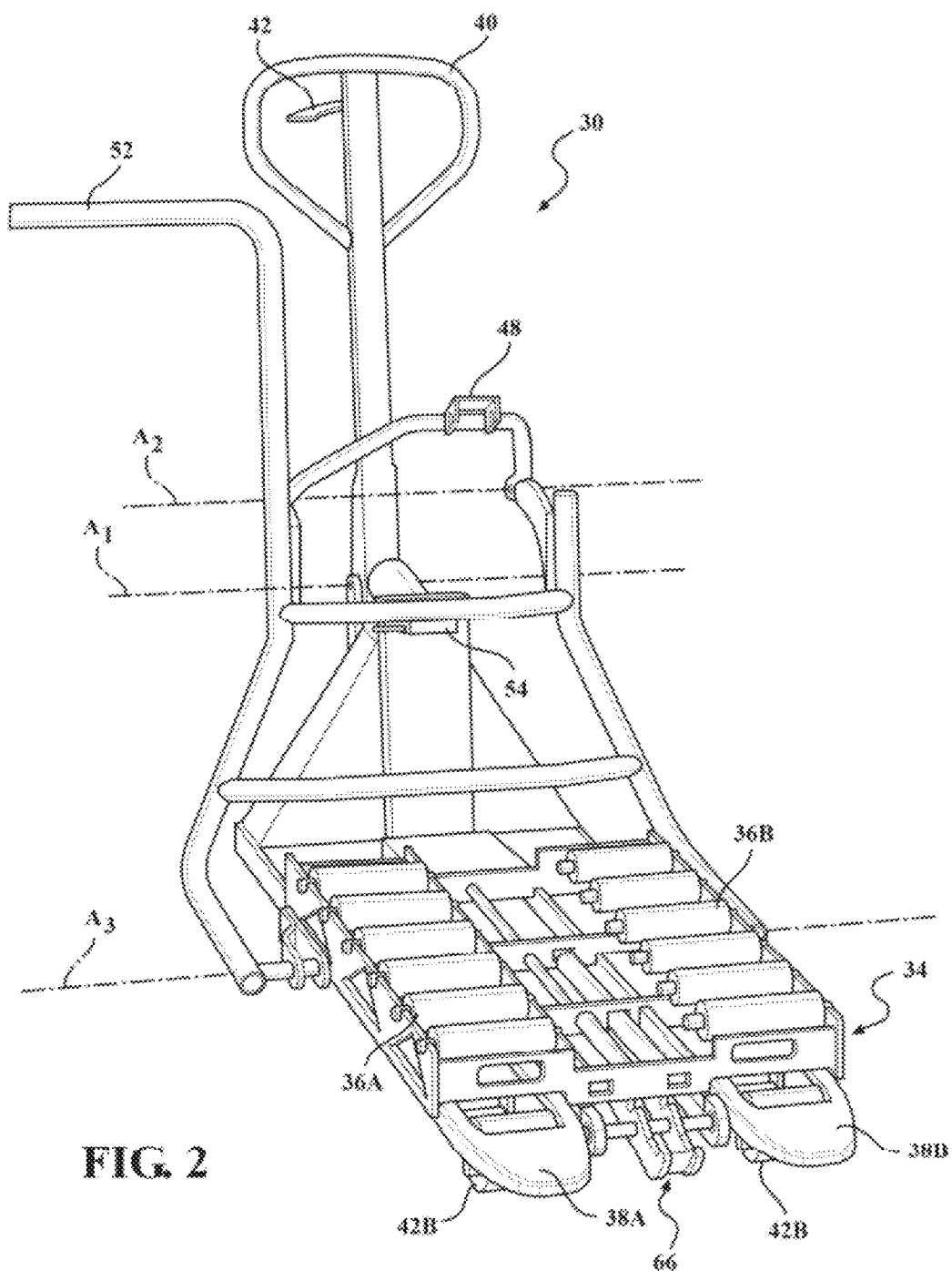
FIG. 2 is a perspective view of a mobile unit of the battery transfer apparatus illustrated in FIG. 1.
Figure 3:
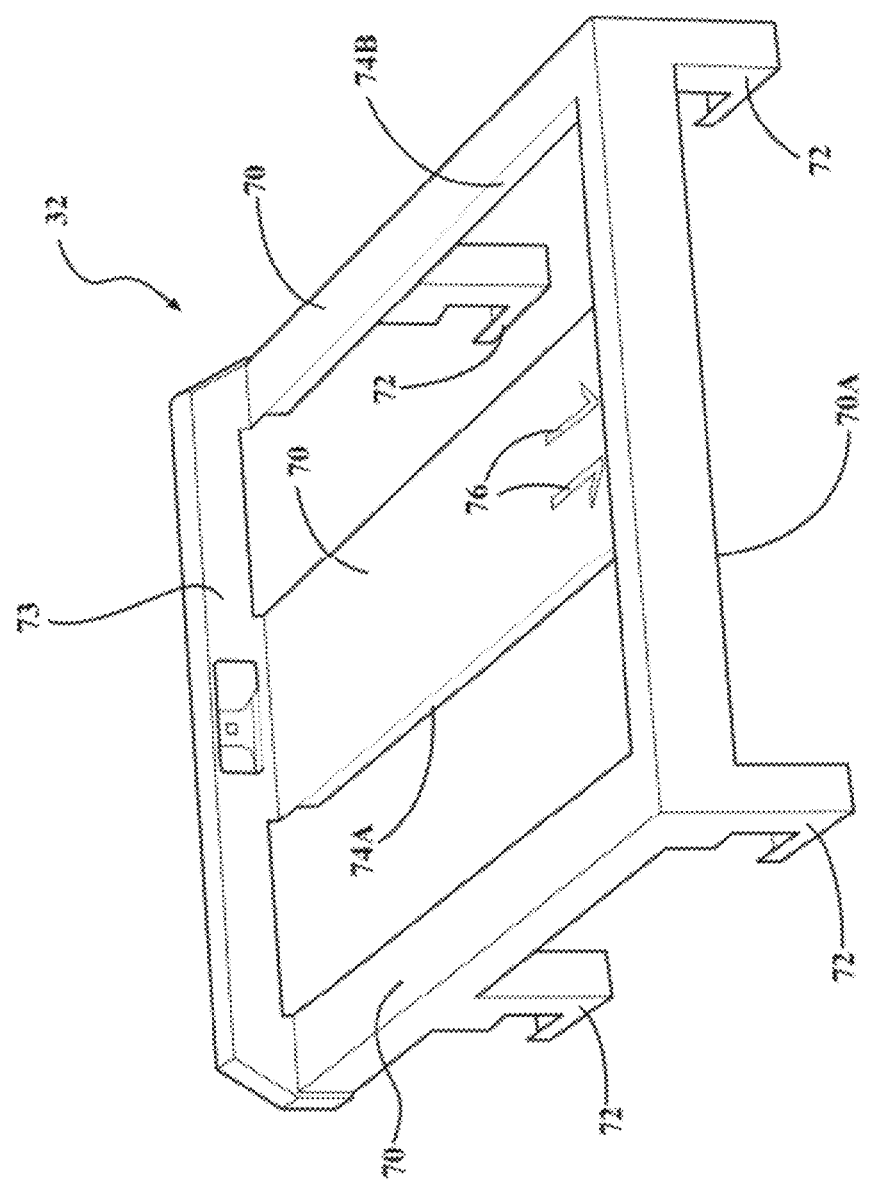
FIG. 3 is a perspective view of a battery stand of the battery transfer apparatus illustrated in FIG. 1.

As shown in FIGS. 4 and 5, the mobile unit 30 may comprise a locking apparatus 54 that is used to retain the extractor assembly 52 in a first position (the first position is shown in FIGS. 1, 2, and 5) until the locking apparatus 54 is unlocked by the operator. In the embodiment shown, unlocking the locking apparatus 54 is accomplished by the operator squeezing a trigger 56 located on the extractor assembly 52. By squeezing the trigger 56, a cable (not shown) coupled to the trigger 56 moves a latch 58 (see FIG. 4) into alignment with an opening (not shown) in a lock box 60 or apron of the locking apparatus 54 so as to allow movement of the latch 58 out of the opening, thus permitting rotation of the extractor assembly 52 about the third axis $A_3$. It is noted that additional and/or alternate measures may be taken to prevent the extractor assembly 52 from moving out of the first position.

Referring to FIGS. 1 and 2, the mobile unit 30 preferably comprises securing structure 66 that is used to secure the mobile unit 30 to the MHV 12 during battery transfer operations, i.e., so as to prevent the mobile unit 30 from moving relative to the MHV 12. The securing structure 66 is capable of being released, i.e., so as to allow relative movement between the mobile unit 30 and the MHV 12, from the opposite side of the mobile unit 30 than the MHV 12. Additional details in connection with exemplary securing structure will be discussed herein with reference to FIGS. 19-21.

The mobile unit 30 may optionally comprise a locking device (not shown), such as a brake, for locking at least one of the wheels 42 of the mobile unit 30 so as to immobilize the mobile unit 30.

Referring now to FIGS. 1 and 3-5, the battery stand 32 according to this embodiment of the invention will now be described. The battery stand 32 is adapted to be engaged by the mobile unit 30 during battery transfer operations and can also be used independently, i.e., without the mobile unit 30, to store the battery 16 when the battery 16 is out of the battery compartment 14 of the MHV 12.

The battery stand 32 comprises a top wall 70, support structure 72, and a backstop 73. The top wall 70 in the embodiment shown comprises a substantially flat surface having a pair of axially elongated openings 74A, 74B formed therein. The openings 74A, 74B receive the rollers 36A, 36B during battery transfer operations as will be described herein. A lower surface 70A of the top wall 70 is engaged by the load handling structure 34 when the load handling structure 34 is raised for a battery transfer operation so as to lift the battery stand 32, as will be described in detail below. The support structure 72 in the embodiment shown comprises a plurality of feet that extend downwardly from the top wall 70 but may comprise any suitable type of structure capable of structurally supporting the battery stand 32 and the battery 16 on a surface, e.g., the floor, another battery, a shelf, etc. The backstop 73 provides an abutment surface for ensuring that the battery 16 is properly positioned on the battery stand 32.

The battery stand 32 according to this embodiment of the invention includes an alignment aid 76 that assists the operator with properly aligning the battery transfer apparatus 18 with the MHV 12 for battery transfer operations. In the embodiment shown, the alignment aid 76 comprises arrows formed in the top wall 70 of the battery stand 32, which arrows are aligned with a groove 78 (see FIG. 4) or markings formed on the MHV 12 in an appropriate location so as to provide a guide for properly aligning the battery transfer apparatus 18 with the MHV 12 for battery transfer operations.

Another exemplary battery transfer apparatus 104 is illustrated in FIGS. 6-7, and a method for unloading a battery 100 from a MHV 102 using the battery transfer apparatus 104 is illustrated in FIGS. 8-14. The battery transfer apparatus 104 according to this embodiment comprises a mobile unit 106 and a battery stand 108, as shown in FIGS. 6 and 7, respectively. A majority of the features of the battery transfer apparatus 104 according to this embodiment are similar to the features of the battery transfer apparatus 18 described above with reference to FIGS. 1-5 and thus may not be described in detail for the battery transfer apparatus 104 of FIGS. 6 and 7.

Referring to FIG. 8, the battery transfer apparatus 104 is positioned with respect to the MHV 102 for a battery unloading operation. Positioning the battery transfer apparatus 104 with respect to the MHV 102 may be accomplished by pushing the battery transfer apparatus 104 up to the side of the MHV 102 adjacent a battery compartment 102A such that an alignment aid 110 (see FIG. 7) provided on the battery stand 108 is aligned with a groove (not shown in this embodiment) or other marking formed on the MHV 102.

Once the battery transfer apparatus 104 is properly positioned for a battery unloading operation, a lever 109 (see FIG. 6) provided on the mobile unit 106 is moved to a fork raising position. A handle structure 111 of the mobile unit 106 is then pumped as described above to raise load handling structure 112 of the mobile unit 106, as shown in FIG. 10. The load handling structure 112 according to this embodiment comprises a pair of forks 114A, 114B and four rollers 116A-D that extend laterally between the forks 114A, 114B, see FIG. 6. When the load handling structure 112 is raised, the rollers 116A-D extend through correspondingly shaped openings 118A-D formed in the battery stand 108 and the load handling structure 112 contacts a lower surface 113A of a top wall 113 of the battery stand 108, as shown in FIG. 10. The load handling structure 112 is raised until the rollers 116A-D are at a proper height to receive the battery 100 from the battery compartment 102A of the MHV 102. It is noted that as the load handling structure 112 is raised, the battery stand 108 is also raised due to the engagement of the load handling structure 112 with the lower surface 113A of the top wall 113 of the battery stand 108. Further, according to this embodiment, when the load handling structure 112 is raised, a hollow cylindrical member 112A (see FIG. 6) of the load handling structure 112 is moved up and receives a pin 108A or tab that extends downwardly from a rear portion of the battery stand 108. The pin 108A provides alignment assistance for lateral alignment of the battery stand 108 with respect to the mobile unit 106.

Once the rollers 116A-D are at the proper height for receiving the battery 100, an extractor assembly 120 that is pivotally coupled to the mobile unit 106 is rotated forward and engaged with the battery 100 so as to secure the battery 100 to the extractor assembly 120, and, thus, to the battery transfer apparatus 104, as shown in FIG. 11.

Figure 12:
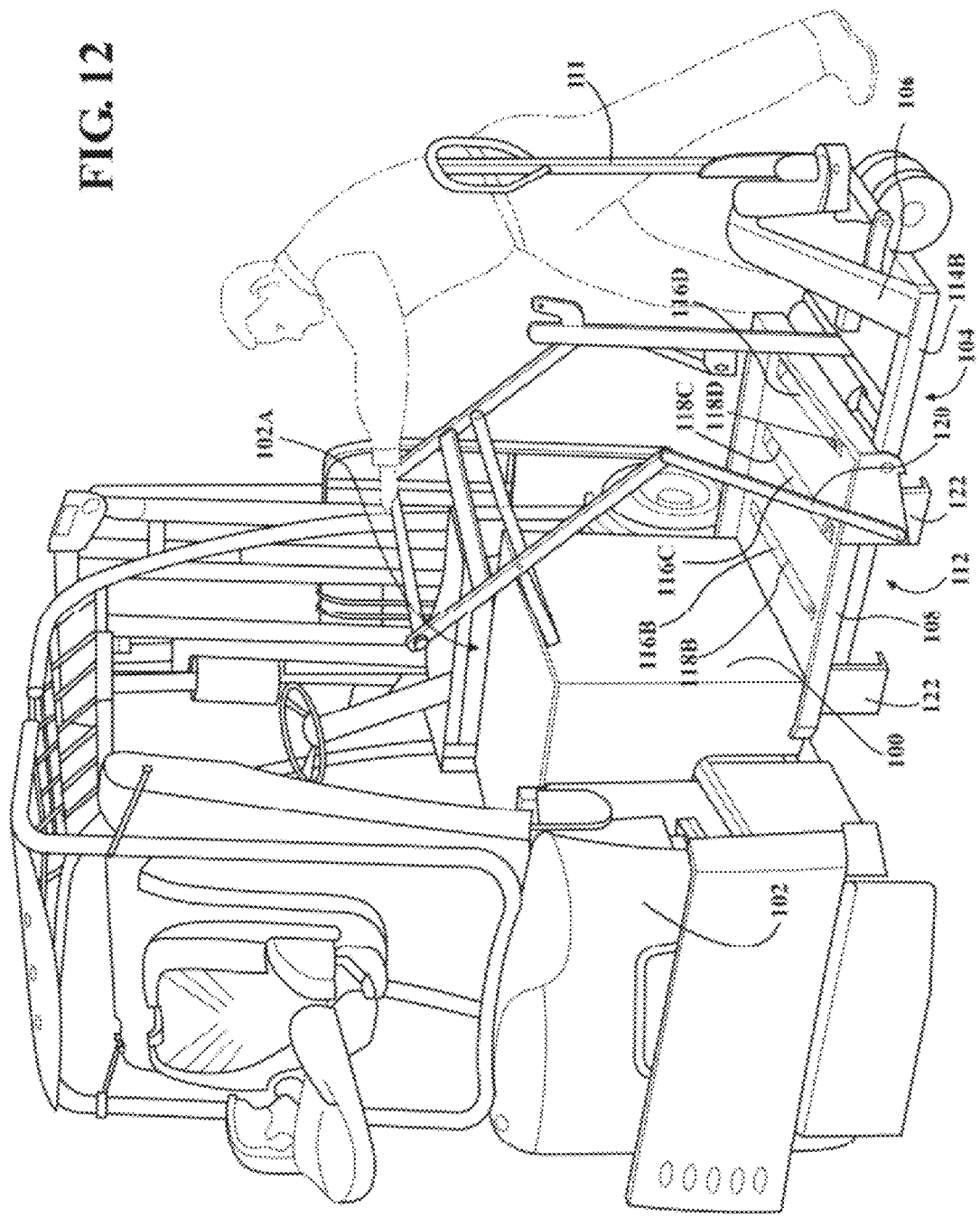
Figure 13:
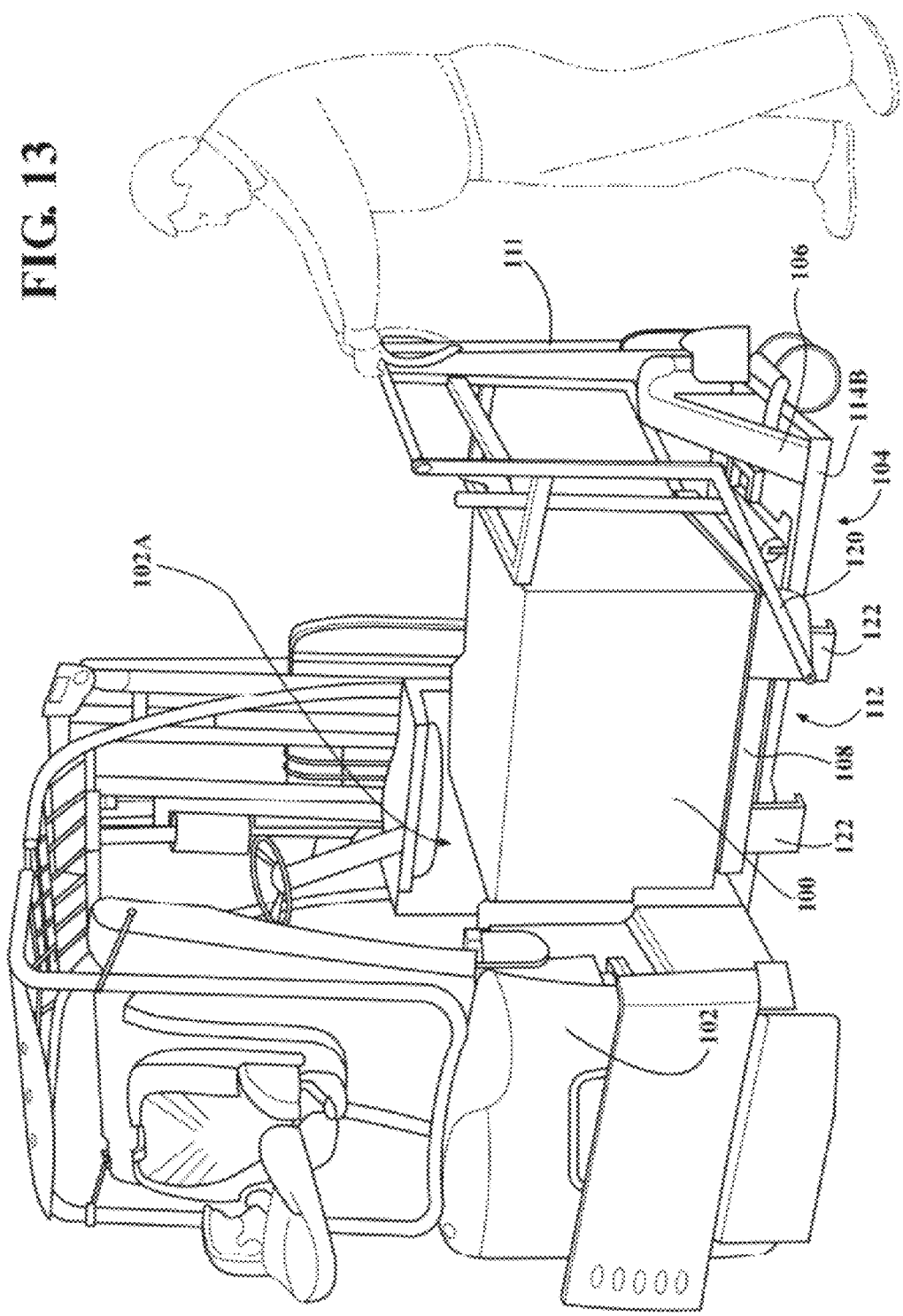

Once the battery 100 is secured to the extractor assembly 120, the extractor assembly 120 is rotated back to pull the battery 100 out of the battery compartment 102A, as shown in FIG. 12. As it is pulled out of the battery compartment 102A, the battery 100 rolls from rollers (not shown) that are conventionally located in the battery compartment 102A onto the rollers 116A-D of the battery transfer apparatus 104.

After the battery 100 is completely pulled out of the battery compartment 102A (see FIG. 13), the battery transfer apparatus 104 is released from the MHV 102 (an exemplary method of uncoupling a battery transfer apparatus from a MHV will be described herein with reference to FIGS. 19-21).

Figure 14:
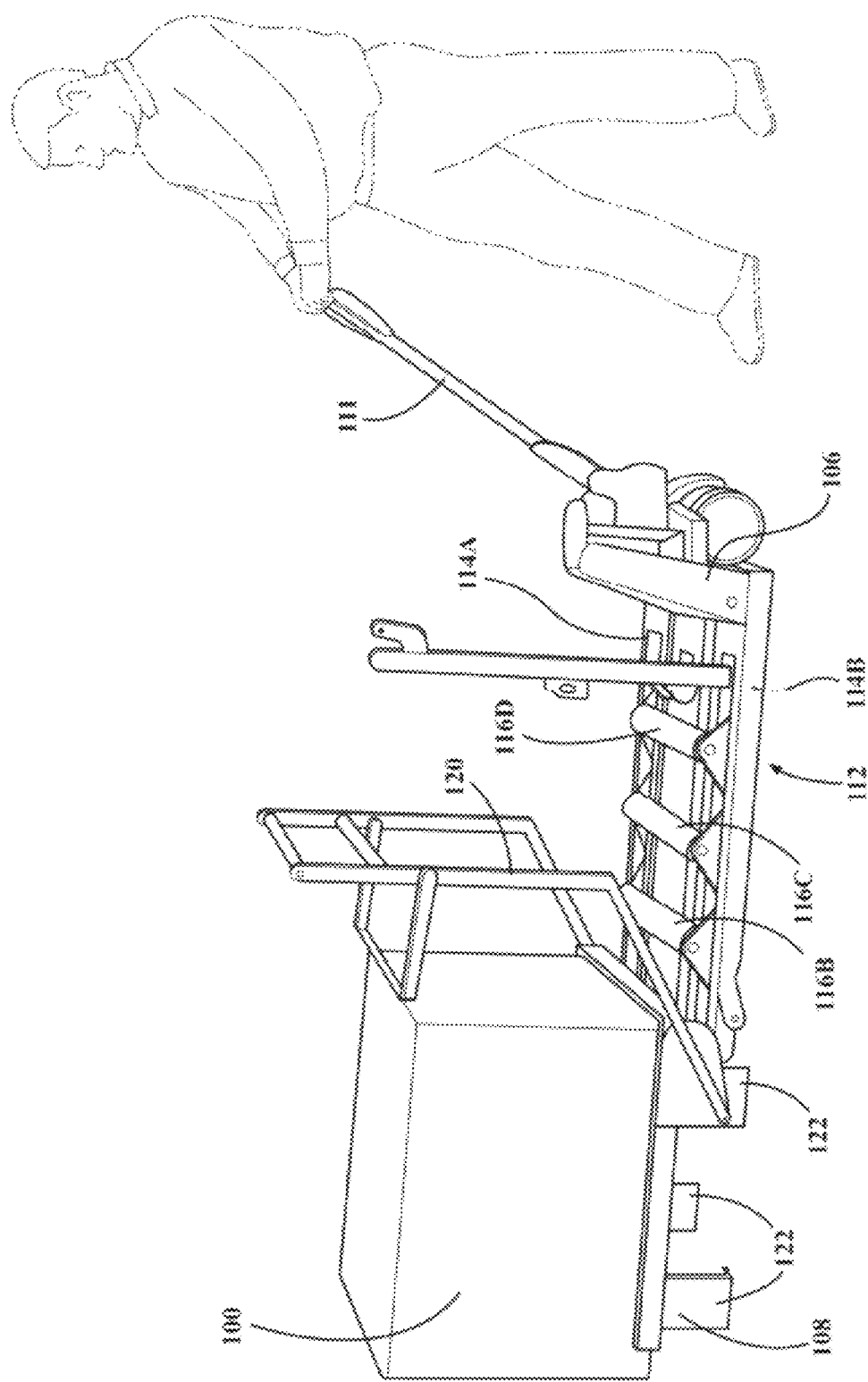
Figure 15:
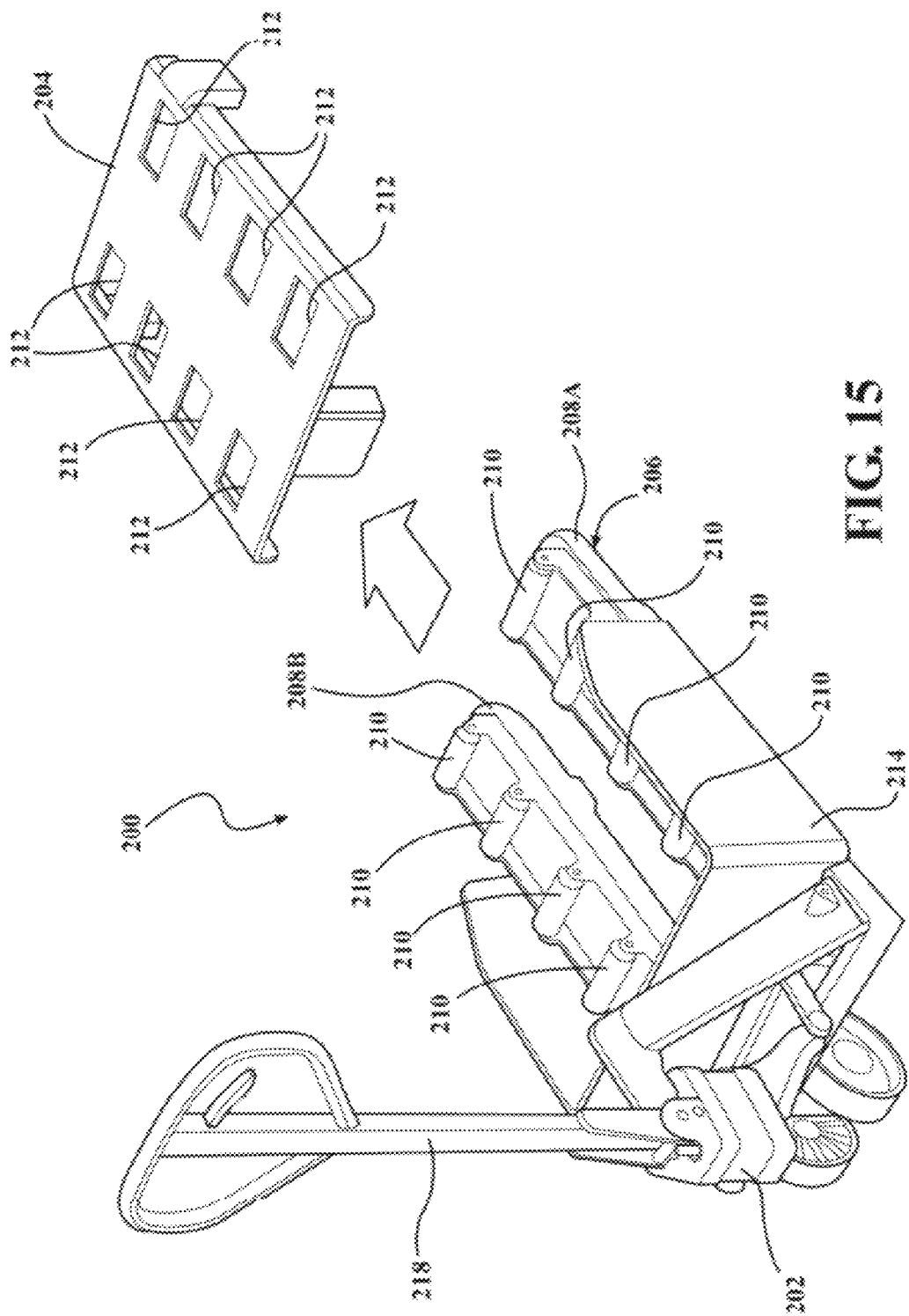
FIGS. 15-17 are perspective views of a battery transfer apparatus according to another aspect of the present invention.

The lever 109 is then moved to a neutral position to allow the handle structure 111 to be pulled by an operator away from the MHV 102. In this embodiment, the handle structure 111 of the mobile unit 106 can be rotated from vertical while the lever 109 is in the neutral position without raising or lowering the load handling structure 112 to allow the operator to more easily pull the mobile unit 106, as shown in FIG. 14.

The operator then moves the battery transfer apparatus 104 to a desired location by pushing or pulling the handle structure 111 and then disengages the battery stand 108 from the mobile unit 106. Specially, the operator moves the lever 109 to a fork lowering position, which causes lowering of the load handling structure 112 and the battery stand 108. Upon feet 122 of the battery stand 108 engaging the floor (or another surface upon which the battery stand 108 is being placed), continued lowering of the load handling structure 112 results in the rollers 116A-D of the load handling structure 112 being lowered down through the openings 118A-D in the battery stand 108. Once the rollers 116A-D are completely lowered down through the openings 118A-D, the lever 109 is moved to the neutral position and the mobile unit 106 is pulled away from the battery stand 108 and the battery 100, as shown in FIG. 14.

It is noted that a battery loading operation can be carried out by reversing the steps of the battery unloading operation described herein. For example, the operator moves the mobile unit 106 under the battery stand 108 with the battery 100 on it and secures the battery 100 to the battery transfer apparatus 104 with the extractor assembly 120. The operator then raises the load handling structure 112 of the mobile unit 106, i.e., by pumping the handle structure 111, so the rollers 116A-D extend up through the openings 118A-D in the battery stand 108 and engage the battery 100. The operator continues raising the load handling structure 112 to lift the battery stand 108. The operator then moves the battery transfer apparatus 104 (with the battery 100 on it) up to the MHV 102 for a battery loading operation. The mobile unit 106 is then secured to the MHV 102 as will be described herein with reference to FIGS. 19-21. The extractor assembly 120 is then rotated forward by the operator to slide the battery 100 from the rollers 116A-D of the battery transfer apparatus 104 onto the rollers in the battery compartment 102A of the MHV 102. Once the battery 100 is loaded into the battery compartment 102A, the battery transfer apparatus 104 is released from the MHV 102 and moved to a desired location, e.g., for storage or to perform another battery transfer operation.

Referring now to FIGS. 15-18, a battery transfer apparatus 200 according to another embodiment of the invention is shown. A majority of the features of the battery transfer apparatus 200 according to this embodiment are similar to the features of the battery transfer apparatus 18 described above with reference to FIGS. 1-5 and thus may not be described in detail for the battery transfer apparatus 200 of FIGS. 15-18.

Figure 16:
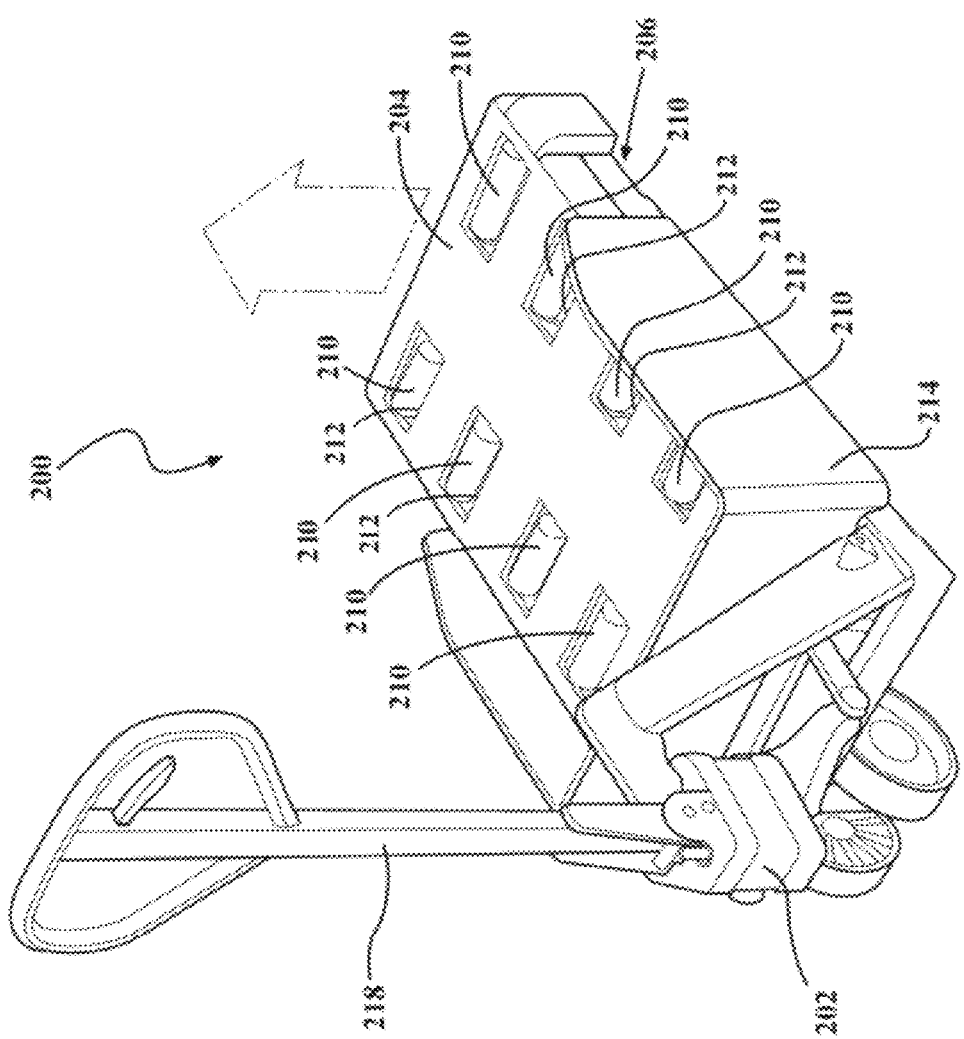

The battery transfer apparatus 200 comprises a mobile unit 202 and a battery stand 204. In this embodiment, load handling structure 206 of the mobile unit 202 comprises a pair of forks 208A, 208B, wherein each fork 208A, 208B includes a plurality of rollers 210, see FIG. 15. The rollers 210 are received in correspondingly shaped openings 212 in the battery stand 204 when the load handling structure 206 is raised and the mobile unit 202 is engaged with the battery stand 204, as shown in FIGS. 16 and 17.

The mobile unit 202 according to this embodiment also comprises a support wall 214. The support wall 214 prevents a battery 216 (see FIGS. 17 and 18) from moving past the support wall 214 toward a handle structure 218 of the mobile unit 202 while the battery 216 is being loaded onto the battery transfer apparatus 200 and when the battery 216 is being moved by the battery transfer apparatus 200.

Figure 17:
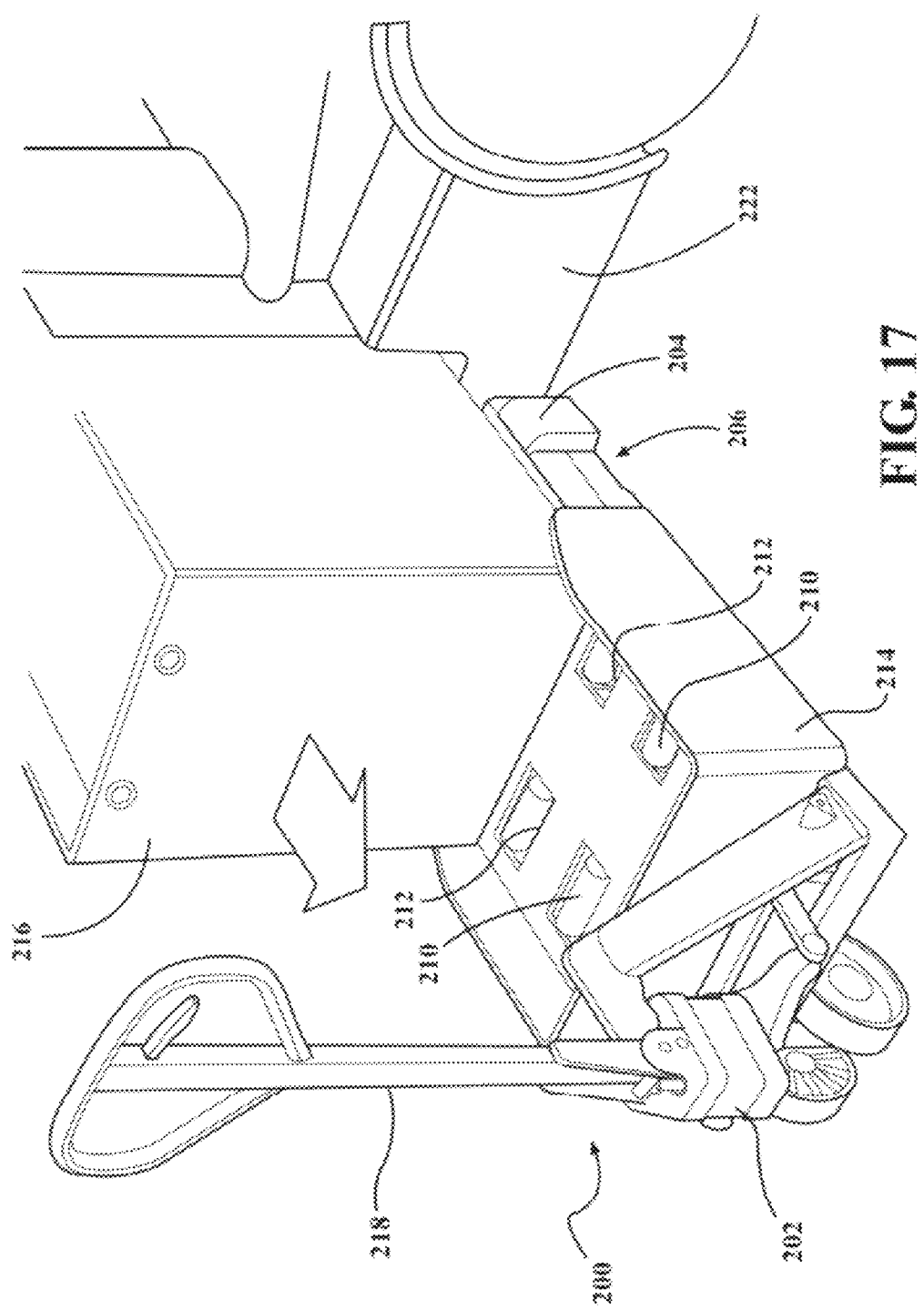
Figure 18:
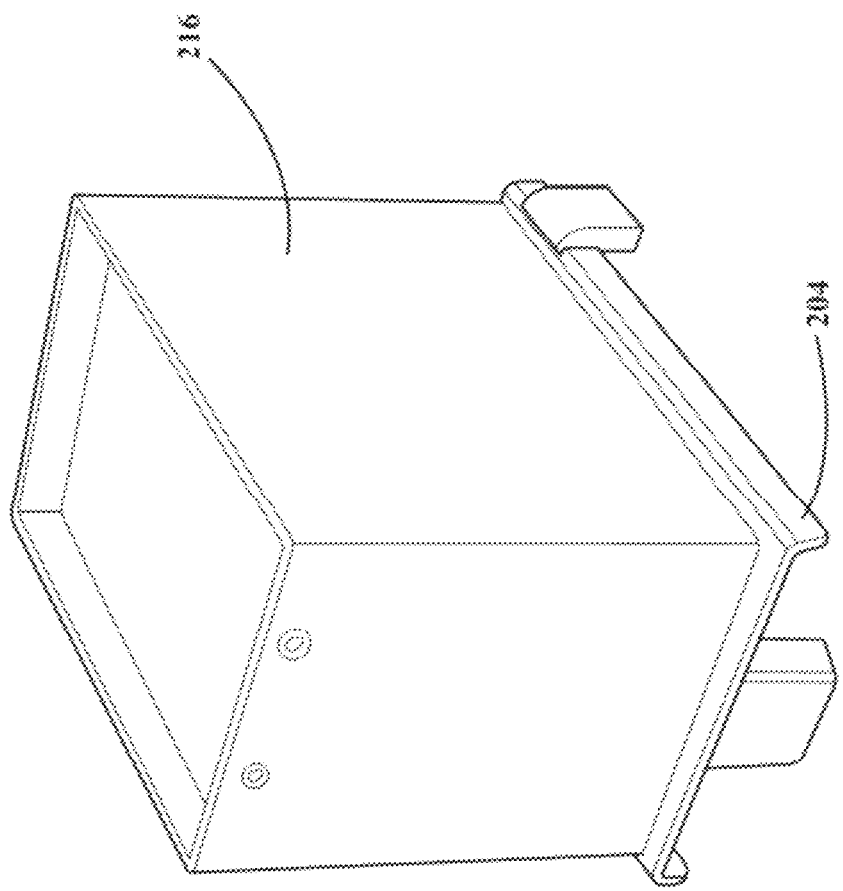
FIG. 18 is a perspective view of a battery stand of the battery transfer apparatus illustrated in FIGS. 15-17 being used to support a battery on a surface.

As shown in FIG. 18, the battery stand 204 can support the battery 216 on the floor when the battery 216 is not installed in a battery compartment 220 of a MHV 222, see FIG. 17. It is noted that the battery stand 204 could also support the battery 216 on other surfaces, such as in a recharging station, on another battery, on a shelf, etc.

Figure 19:
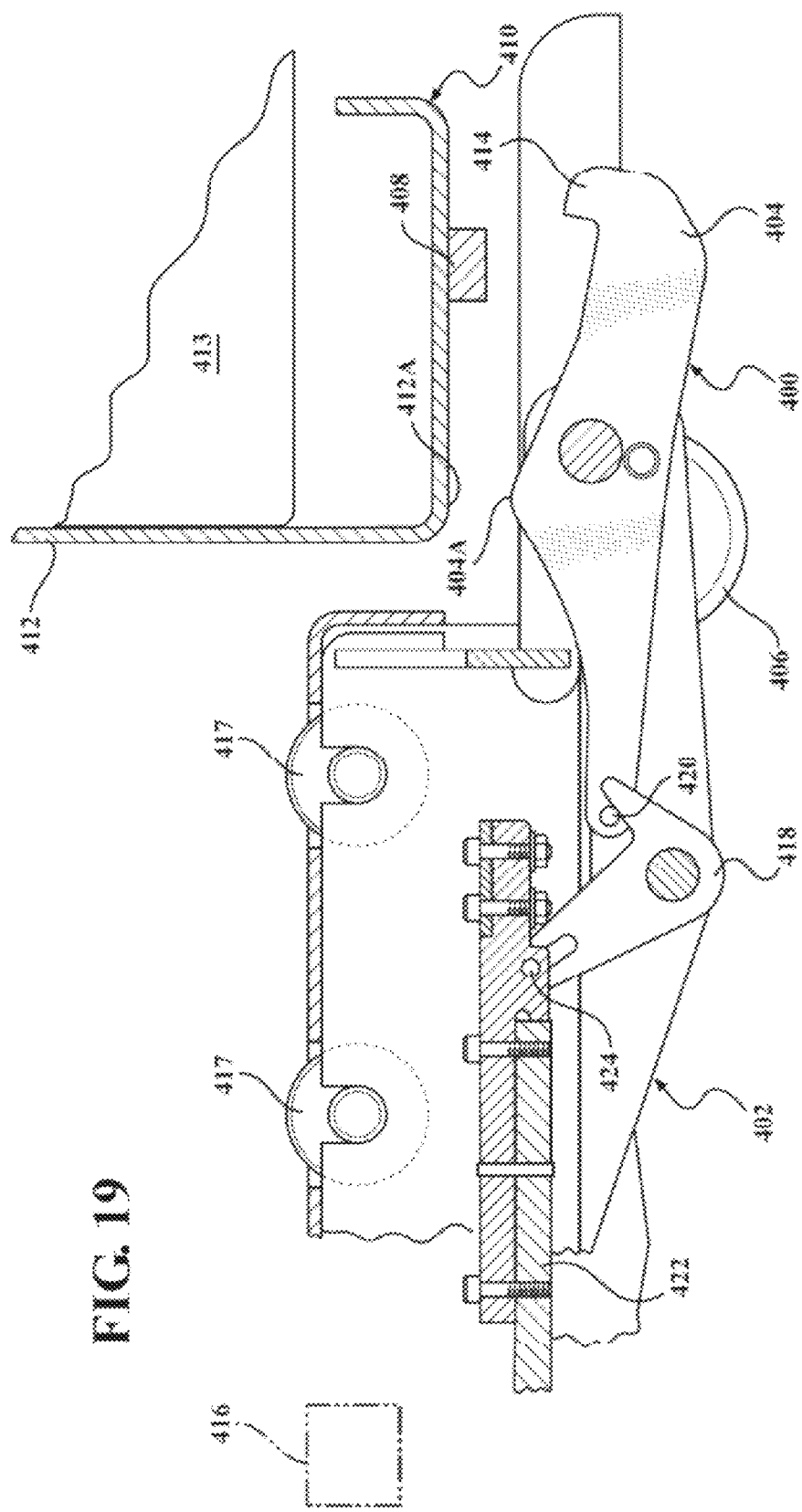
FIGS. 19-21 are side cross sectional views of select components of a battery transfer apparatus according to a further aspect of the present invention.
Figure 20:
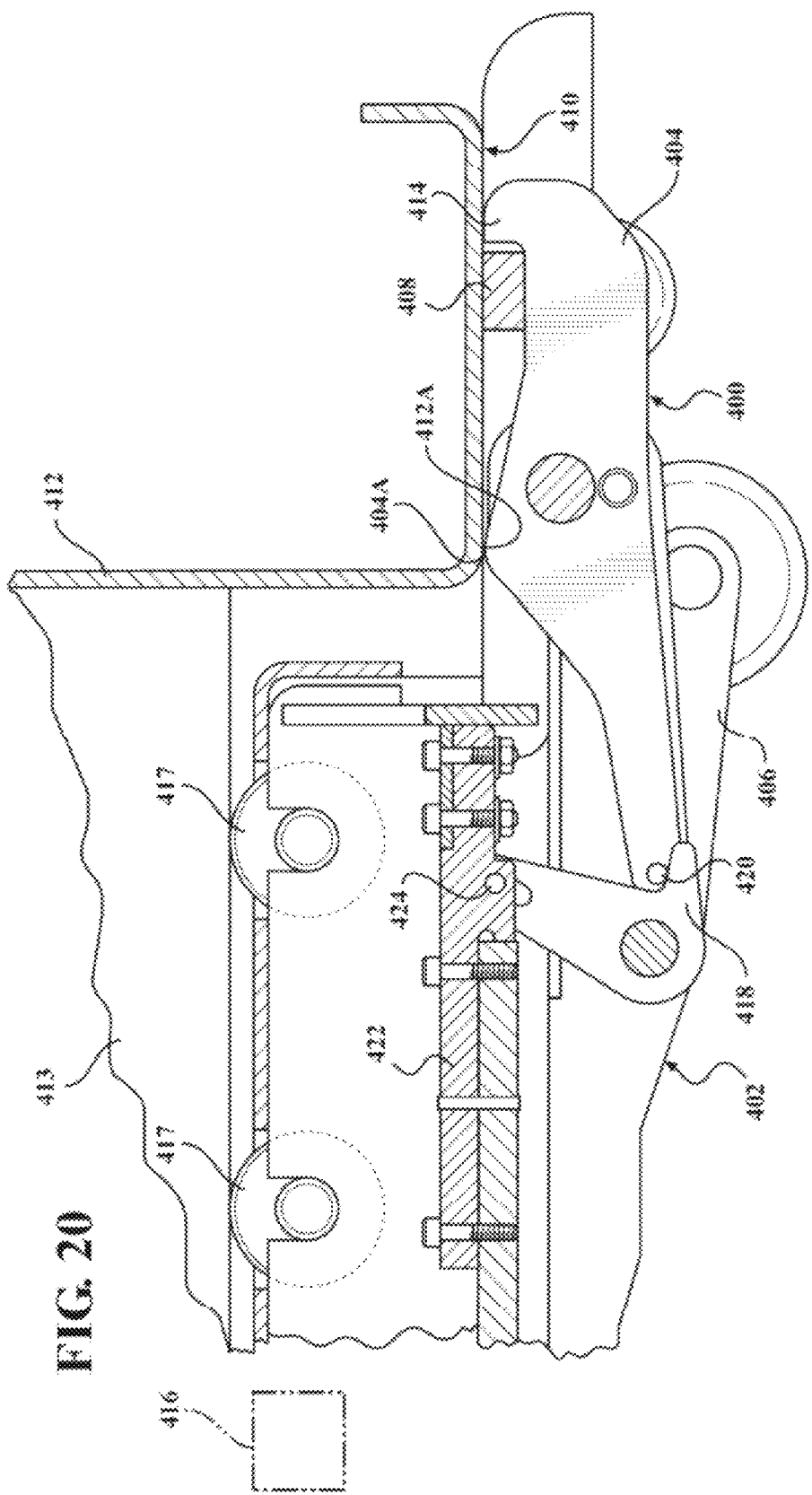
Figure 21:
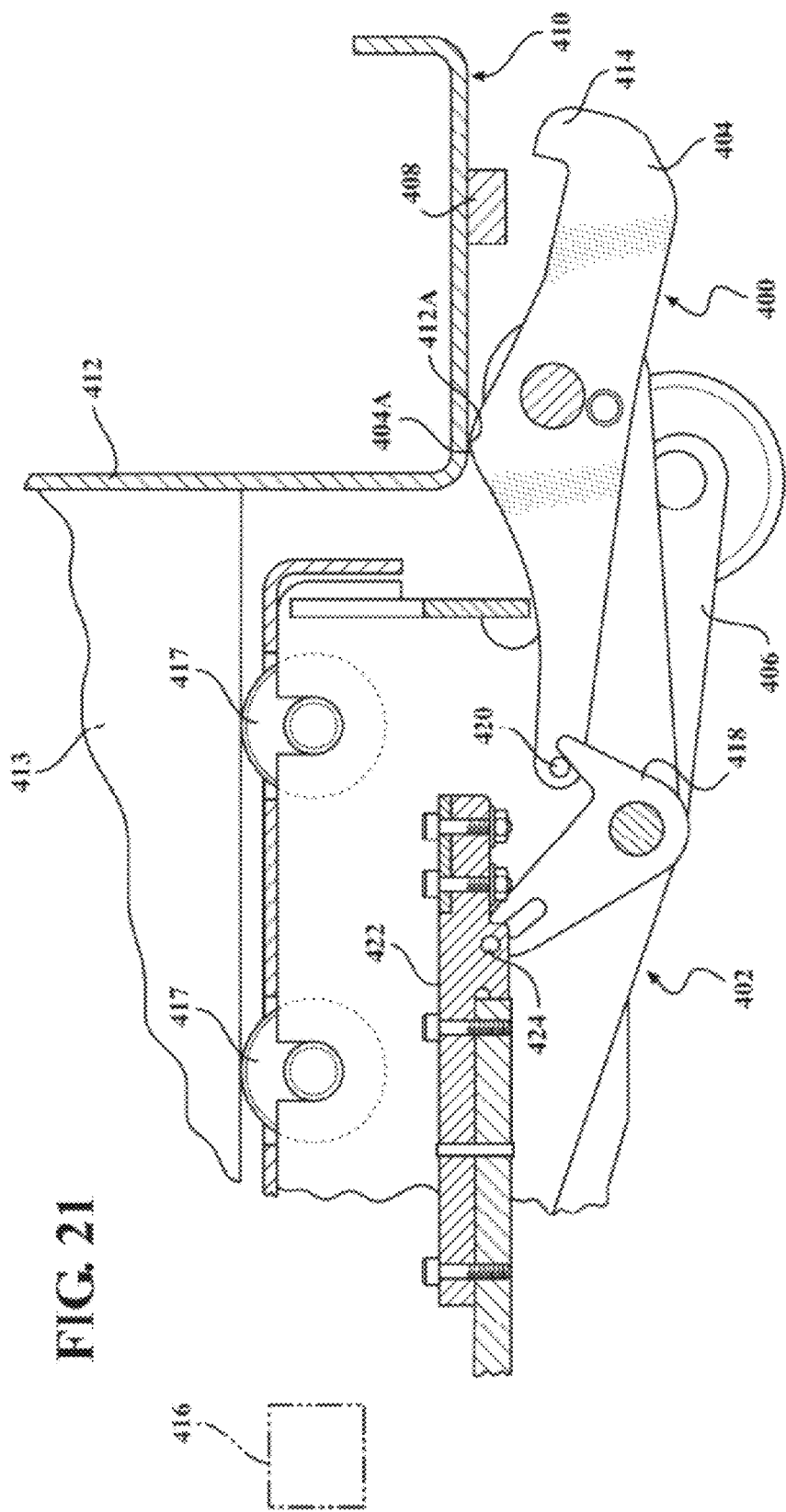

Referring to FIGS. 19-21, securing structure 400 of a battery transfer apparatus 402 according to another embodiment of the invention is shown. The securing structure 400 shown in FIGS. 19-21 comprises a pivoting latch member 404 coupled to a mobile unit 406 of the battery transfer apparatus 402. The latch member 404 is adapted to engage a support bar 408 or other similar structure on a MHV 412 affixed underneath a battery compartment 410 of the MHV 412 that has a battery 413 to be removed.

To implement a battery transfer operation with the battery transfer apparatus 402, the mobile unit 406 is moved up to the MHV 412 such that a hooked end 414 of the latch member 404 moves past the support bar 408, see FIG. 19. Once the hooked end 414 of the latch member 404 is past the support bar 408, engage/disengage structure 416 (also referred to herein as "engage structure" or "disengage structure") of the battery transfer apparatus 402 is actuated so as to raise load handling structure 417 of the battery transfer apparatus 402. The engage/disengage structure 416 may comprise a handle structure of the mobile unit 406, such as the handle structure 40 described above with reference to FIGS. 1-5, wherein actuating the engage/disengage structure 416 may comprise pumping the handle structure 40. It is noted that the engage/disengage structure 416 is preferably located on the opposite side of the battery transfer apparatus 402 than the MHV 412.

As shown in FIGS. 19-21, the latch member 404 is associated with a pivot member 418 via a first pin 420 that is affixed to the latch member 404, such that rotation of the latch member 404 may cause rotation of the pivot member 418 in the opposite direction, and vice versa, as will be described below. The pivot member 418 is associated with an assembly 422, which may comprise a shaft, via a second pin 424. The assembly 422 is spring biased in a direction away from the MHV 412, e.g., with a spring 425 (see FIGS. 26 and 27), and is provided to effect rotation of the latch member 404 out of a battery transfer position after a battery transfer operation is complete, as will be described below.

As the load handling structure 417 is raised, the latch member 404, the assembly 422, and the pivot member 418 are also raised. Upon an upper pivot surface 404A of the latch member 404 contacting a lower surface 412A of the MHV 412 adjacent the battery compartment 410, continued raising of the load handling structure 417 causes the latch member 404 to pivot in a counter-clockwise direction (as the latch member 404 is shown in FIGS. 19-21) so as to move into a battery transfer position, i.e., wherein the hooked end 414 of the latch member 404 engages the support bar 408, as shown in FIG. 20. The engagement of the hooked end 414 of the latch member 404 to the support bar 408 secures the mobile unit 406 to the MHV 412 so as to substantially prevent relative movement between the battery transfer apparatus 402 and the MHV 412 during battery transfer operations. It is also contemplated that the latch member 404 could auto-lock onto the support bar 408 when the battery transfer apparatus 402 is properly positioned for a battery transfer operation, such as with the use of a spring loaded latch member.

The rotation of the latch member 404 into a battery transfer position results in rotation of the pivot member 418 in a clockwise direction (as the pivot member 418 is shown in FIGS. 19-21) via the first pin 420. Such rotation of the pivot member 418 results in movement of the assembly 422 toward the MHV 412 via the second pin 424, i.e., the force exerted on the assembly 422 by the second pin 424 caused by the rotation of the pivot member 418 overcomes the spring bias exerted on the assembly 422 by the spring 425, such that the assembly 422 is moved against the spring bias toward the MHV 412. A battery transfer operation may then be implemented.

Once the battery transfer operation is complete, the hooked end 414 of the latch member 404 is disengaged from the support bar 408 by lowering the load handling structure 417 via the handle structure 40, as described above. Specifically, when the load handling structure 417 is lowered so that the pivot surface 404A is moved away from the lower surface 412A of the MHV 412, the spring biased assembly 422 rotates the pivot member 418 in the counter-clockwise direction. Rotation of the pivot member 418 in turn rotates the latch member 404 in the clockwise direction so that the hooked end 414 of the latch member 404 is disengaged from the support bar 408 so that the mobile unit is no longer secured to the MHV 412 and can be moved away from the MHV 412.

Figure 22:
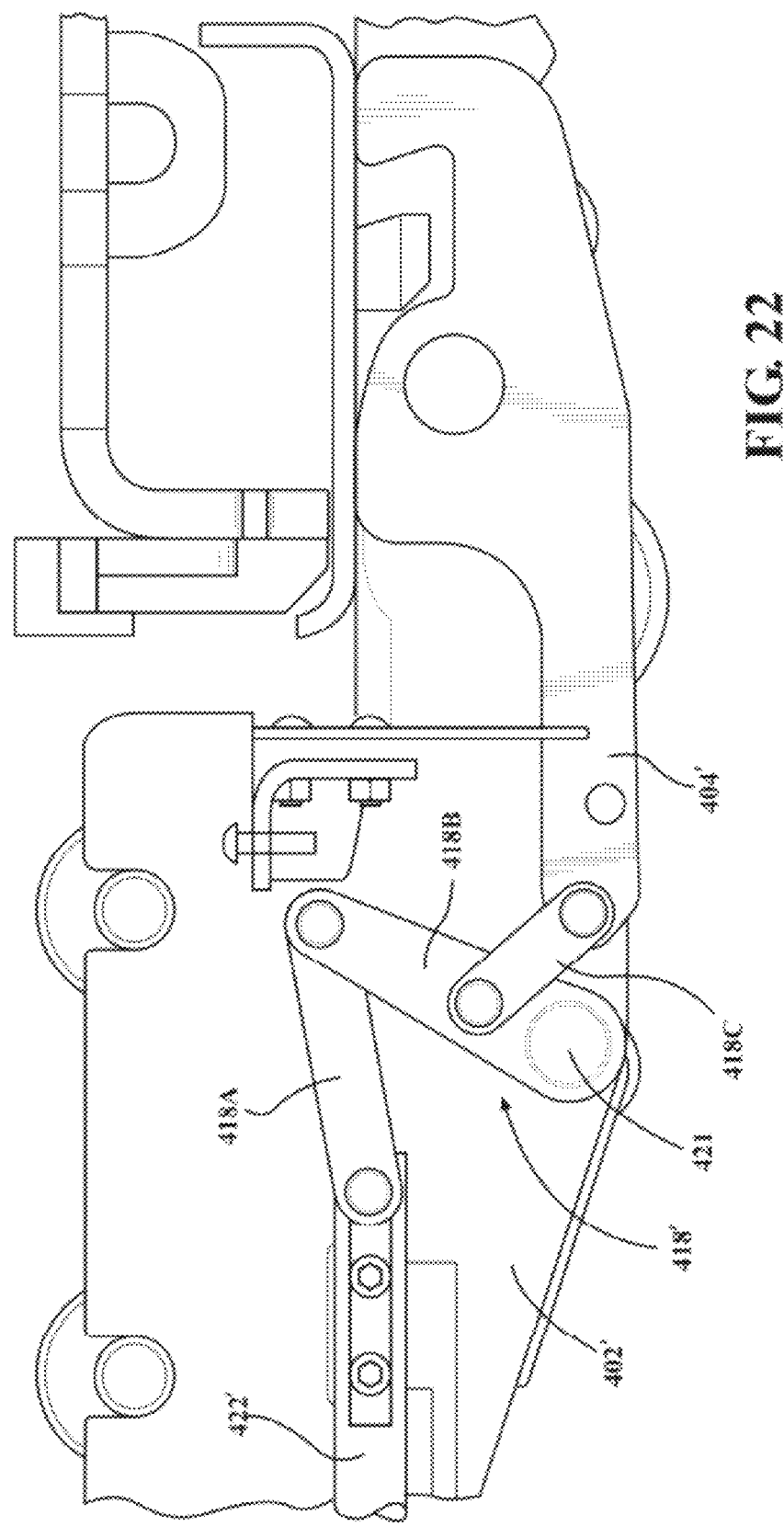
FIG. 22 is a side cross sectional view of an alternate configuration for select ones of the components of the battery transfer device illustrated in FIGS. 19-21.

FIG. 22 illustrates an alternate configuration for select components of the securing structure 400 illustrated in FIGS. 19-21, where structure similar to that disclosed in FIGS. 19-21 includes the same reference number followed by a prime "'" symbol. In the configuration shown in FIG. 22, a pivot member 418' includes a first member 418A, a second member 418B, and a third member 418C. The first member 418A is pivotably coupled to a spring biased assembly 422', the second member 418B is pivotably coupled to the first and third members 418A, 418C and is pivotably mounted to the battery transfer apparatus 402' by a rod 421, and the third member 418C is pivotably coupled to a latch member 404'. In this configuration, there is no relative sliding movement of the spring biased assembly 422', the pivot member 418', or the latch member 404' relative to one another, i.e., all of the part couplings according to this configuration are pivoting couplings.

Referring now to FIGS. 23-27, a battery transfer apparatus 600 according to another embodiment of the invention is shown. A majority of the features of the battery transfer apparatus 600 according to this embodiment are similar to the features of the battery transfer apparatus 18 described above with reference to FIGS. 1-5 and thus may not be described in detail for the battery transfer apparatus 600 of FIGS. 23-25.

Figure 24:
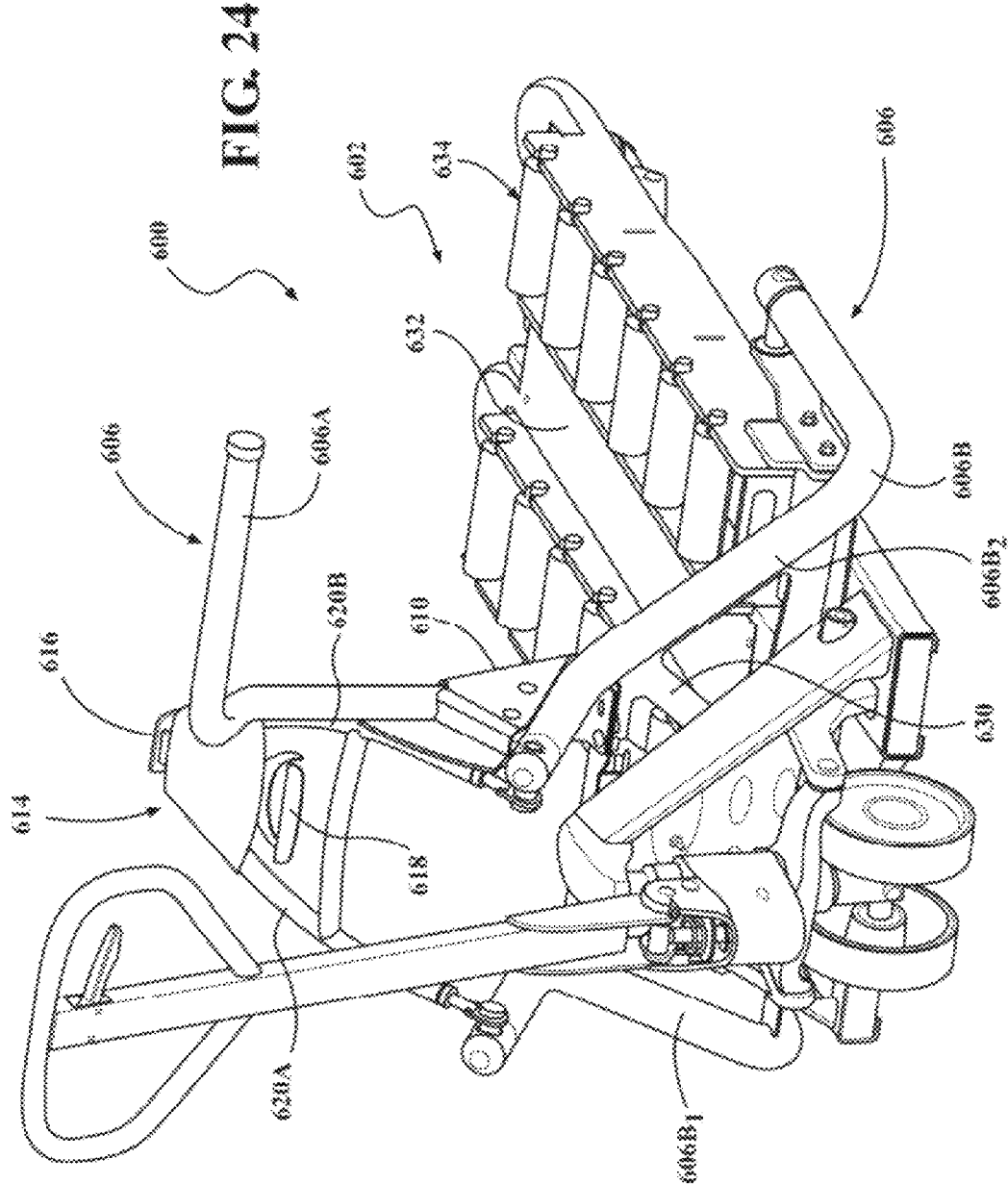
Figure 25:
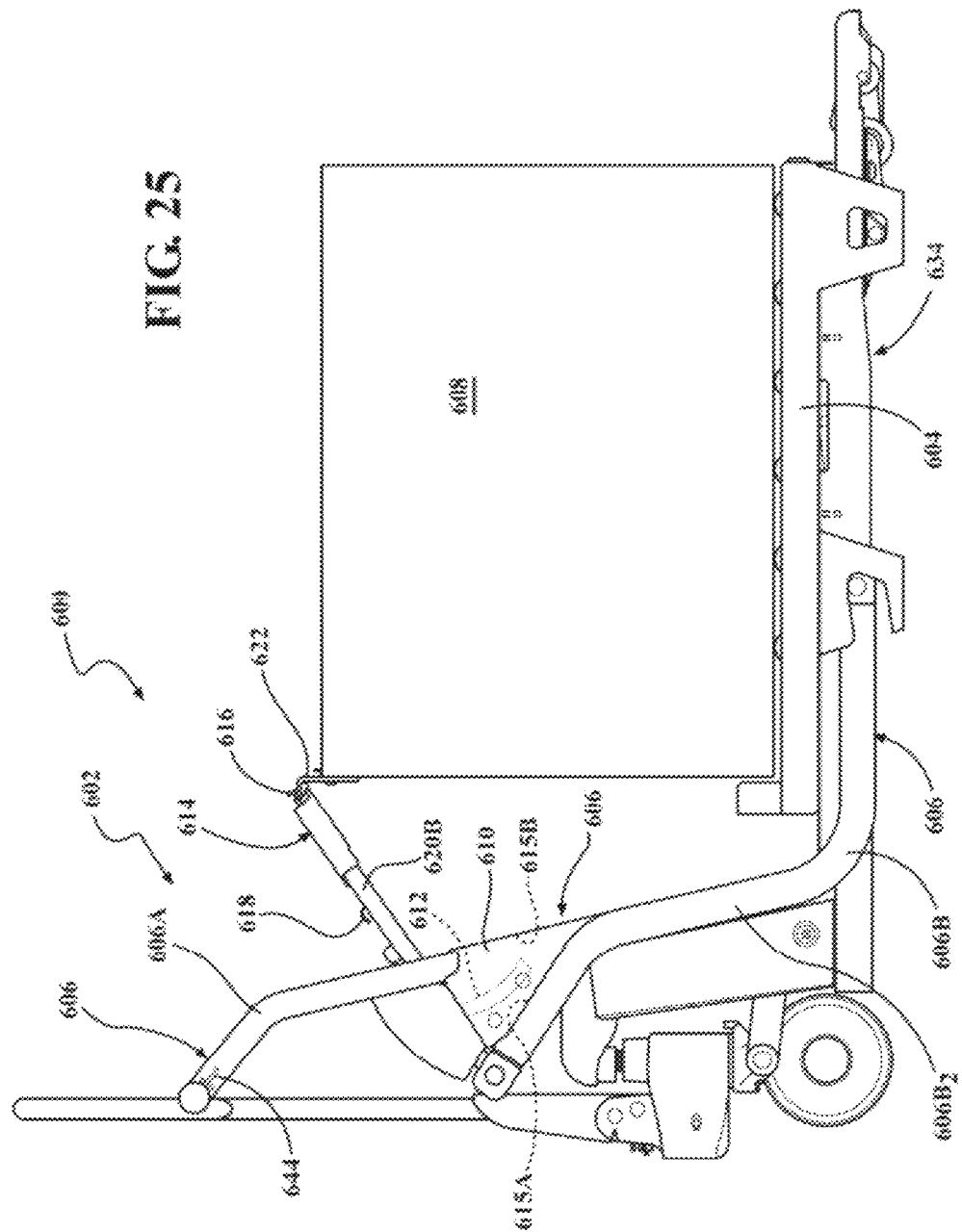

The battery transfer apparatus 600 comprises a mobile unit 602 (see FIGS. 23-27) and a battery stand 604 (see FIG. 25). In this embodiment, an extractor assembly 606 of the mobile unit 602 for moving a battery 608 (see FIG. 25) into or out of a battery compartment of a MHV is formed from two sections, namely, an upper section 606A and a lower section 606B. The upper section 606A is rigidly coupled to the lower section 606B, e.g., by bolting, within a housing 610 that is affixed to the extractor assembly 606.

The housing 610 also houses an extension member 612, shown in phantom lines within the housing 610 in FIGS. 23 and 25, which rigidly extends from a remaining portion of a hook assembly 614, which will be described below. The extension member 612 is rotated within the housing 610 as the hook assembly 614 is rotated during battery transfer operations, i.e., when the hook assembly 614 is used to secure the battery 608 and when the hook assembly 614 is released from the battery 608, as will be described below. The extension member 612 only allows the hook assembly 614 to be rotated within a predefined arc, which for example may comprise about 90°. Specifically, as the hook assembly 614 is rotated in a clockwise direction as shown in FIGS. 23-27, the extension member 612 rotates within the housing 610 and ultimately may contact a lower inner surface 615A (see FIGS. 23 and 25) of the housing 610 to define a forwardmost position for the hook assembly 614, and as the hook assembly 614 is rotated in a counter-clockwise direction as shown in FIGS. 23-27, the extension member 612 rotates within the housing 610 and ultimately may contact a forward inner surface 615B (see FIGS. 23 and 25) of the housing 610 to define a rearwardmost position for the hook assembly 614.

The hook assembly 614 according to this embodiment comprises a tongue 616, also referred to herein as a hook structure, a latch 618 for actuating the tongue 616, two support bars 620A, 620B pivotably coupled to the extractor assembly 606 for supporting the hook assembly 614 including the tongue 616 and the latch 618, and the extension member 612, which extends from the second support bar 620B into the housing 610 as described above. The latch 618 is engaged by an operator during a battery grabbing procedure to actuate the tongue 616, i.e., to position the tongue 616 such that the tongue 616 is capable of receiving a battery bracket 622 (see FIG. 25) affixed to the battery 608. Once the battery bracket 622 is received by the tongue 616, the latch 618 is disengaged by the operator, and a spring assembly (not shown) causes the tongue 616 to pivot so as to move into a locking position to lock the battery 608 to the hook assembly 614, as shown in FIG. 25.

When the battery 608 is to be unloaded, such as when the battery 608 is being set down for storage/charging or being installed into a MHV, the latch 618 is engaged by the operator during a battery releasing procedure to actuate the tongue 616, i.e., to position the tongue 616 such that the tongue 616 is capable of releasing the battery bracket 622. Once the battery bracket 622 is released from the tongue 616 and the battery bracket 622 is no longer within the confines of the tongue 616, the latch 618 is disengaged by the operator, and the spring assembly causes the tongue 616 to move back into its non-actuated position, as shown in FIGS. 23 and 24.

Figure 23:
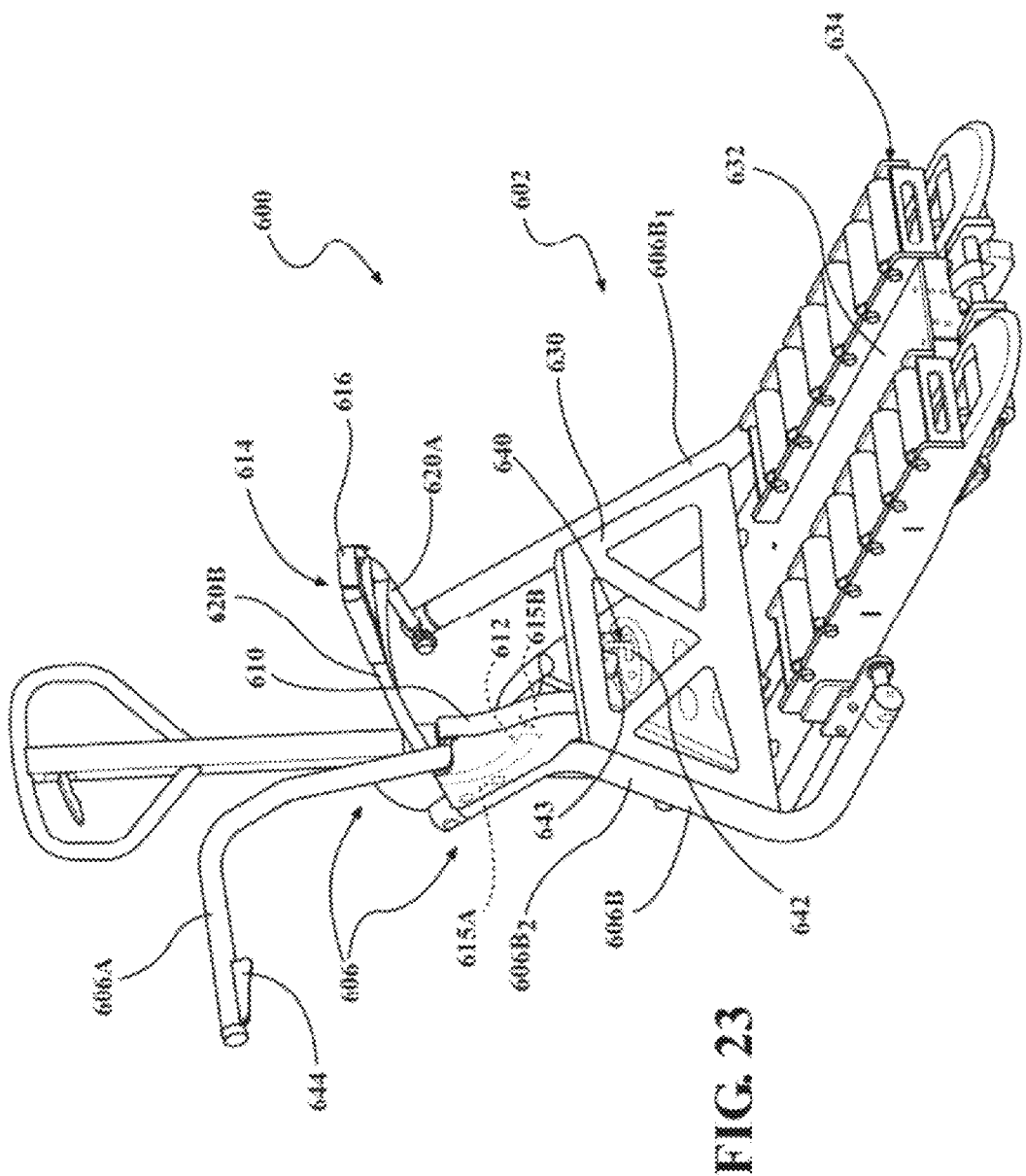

A structural web member 630 shown most clearly in FIG. 23 is provided between bar members 606B$_1$, 606B$_2$ of the lower section 606B of the extractor assembly 606. The web member 630 provides additional structural rigidity for the extractor assembly 606.

Additionally shown in FIG. 23 is a cover structure 632 that covers hardware of load handling structure 634. The load handling structure 634 is substantially similar to that described above with reference to FIGS. 1-5 and will not be specifically described herein.

Referring to FIG. 23, a locking apparatus 640 according to this embodiment comprises a latching member 642 that is engaged by a spring loaded bracket 643 provided on the web member 630 to lock the extractor assembly 606 in place. The latching member 642 can be released from the spring loaded bracket 643 to allow movement of the extractor assembly 606 by an operator squeezing a trigger 644 located on the extractor assembly 606. After a battery transfer operation is completed and the extractor assembly 606 is moved back to the position shown in FIGS. 23-25, the spring loaded bracket 643 engages the latching member 642 to prevent movement of the extractor assembly 606 until the trigger 644 is again squeezed by an operator to release the latching member 642 from the spring loaded bracket 643. An audible clicking sound may accompany the engagement of the latching member 642 to the spring loaded bracket 643 to alert the operator of the engagement.

Referring now to FIGS. 26 and 27, a locking assembly 650 according to this embodiment is illustrated. The locking assembly 650 comprises a shaft 652 that moves longitudinally back and forth between a locked first position illustrated in FIG. 26 and an unlocked second position illustrated in FIG. 27 to selectively prevent and allow the extractor assembly 606 from being rotated.

When the mobile unit 602 is not secured to a MHV, securing structure 654, such as the securing structure described above with reference to FIG. 22, is located in a non-engaged position such that the shaft 652 is positioned in the locked first position. While in the locked first position, the shaft 652 extends through an opening in a bracket 656 associated with the extractor assembly 606 so as to prevent the extractor assembly 606 from being moved.

When the mobile unit 602 is secured to a MHV, e.g., for a battery transfer operation, the securing structure 654 is located in an engaged position such that the shaft 652 is positioned in the unlocked second position. It is noted that the MHV is not shown in FIG. 27 for clarity. While in the unlocked second position, the shaft 652 is removed from the opening in the bracket 656 such that the extractor assembly 606 is permitted to be moved for a battery transfer operation, i.e., to grab a battery or to release a battery. Securing the mobile unit 602 to a MHV is effected by rotation of a latch member 658 of the securing structure 654 such that the latch member 658 engages a support bar on the MHV (as described above), wherein rotation of the latch member 658 pulls the shaft 652 out of the opening in the bracket 656 to allow movement of the extractor assembly 606. Similarly, releasing the mobile unit 602 from the MHV as described above causes the shaft 652 to move into the opening in the bracket 656 as a result of rotation of the latch member 658 of the securing structure 654 in the opposite direction so as to release the support bar on the MHV.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A battery transfer apparatus for loading and/or unloading batteries from materials handling vehicles comprising:

a mobile unit for temporarily supporting and transporting a battery that is to be transferred into or out of a materials handling vehicle, said mobile unit comprising:

load handling structure for supporting said battery, said load handling structure comprising at least one roller that is used to roll said battery into or out of the materials handling vehicle on said at least one roller;

an extractor assembly that can be rotated forward and backward to transfer said battery into or out of a materials handling vehicle; and a locking assembly for preventing said extractor assembly from being rotated unless said mobile unit is secured to a materials handling vehicle; and a battery stand comprising a top wall and support structure, said top wall including at least one opening and said support structure adapted to engage a surface upon which said battery stand is placed so as to support said battery stand on the surface; and wherein said battery stand is adapted to be engaged by said mobile unit during a transfer of said battery into or out of the materials handling vehicle by inserting said at least one roller up through said at least one opening in said top wall of said battery stand such that said at least one roller can engage said battery through said at least one opening, and wherein said battery stand is capable of storing said battery while said battery is out of the materials handling vehicle when said battery stand is disengaged from said load handling structure.

2. The battery transfer apparatus according to claim 1, wherein said mobile unit comprises a handle structure for steering said mobile unit.

3. The battery transfer apparatus according to claim 1, wherein said mobile unit comprises a hook structure for engaging and securing said battery during battery transfer operations.

4. The battery transfer apparatus according to claim 3, wherein said mobile unit further comprises a latch for actuating said hook structure such that said hook structure is capable of engaging and securing said battery during battery transfer operations.

5. The battery transfer apparatus according to claim 4, wherein said latch is also used for actuating said hook structure such that said hook structure is capable of releasing said battery after battery transfer operations.

6. The battery transfer apparatus according to claim 3, wherein said hook structure is coupled to said extractor assembly that can be rotated forward to allow said hook structure to engage and secure a battery for a battery transfer operation, wherein said extractor assembly can be rotated backwards after said hook structure is engaged and secured to said battery to unload said battery out of a materials handling vehicle.

7. The battery transfer apparatus according to claim 1, wherein said mobile unit comprises structure for raising said at least one roller up through said at least one opening in said battery stand.

8. The battery transfer apparatus according to claim 7, wherein said mobile unit comprises securing structure to secure said mobile unit to the materials handling vehicle during battery transfer operations.

9. The battery transfer apparatus according to claim 8, wherein said securing structure locks onto the materials handling vehicle when said at least one roller is raised for a battery transfer operation.

10. The battery transfer apparatus according to claim 8, wherein said mobile unit comprises disengage structure for disengaging said securing structure from the materials handling vehicle, said disengage structure located on the opposite side of said mobile unit than the materials handling vehicle when the battery transfer apparatus is properly positioned for a battery transfer operation.

11. The battery transfer apparatus according to claim 1, wherein said mobile unit comprises a plurality of wheels for moving said mobile unit.

12. The battery transfer apparatus according to claim 11, wherein said mobile unit comprises a locking device for immobilizing said mobile unit.

13. The battery transfer apparatus according to claim 1, wherein said at least one roller comprises two sets of rollers and said battery stand comprises two elongated openings that receive corresponding ones of said two sets of rollers of said load handling structure.

14. The battery transfer apparatus according to claim 1, wherein said at least one roller comprises a plurality of rollers and said battery stand comprises a plurality of openings, each opening receiving a corresponding one of said plurality of rollers of said load handling structure.

15. The battery transfer apparatus according to claim 1, wherein said battery stand comprises an alignment aid for properly aligning the battery transfer apparatus with the materials handling vehicle for battery transfer operations.

16. The battery transfer apparatus according to claim 1, wherein said at least one roller is moved up through said at least one opening in said top wall of said battery stand such that said at least one roller can engage said battery through said at least one opening.

17. A system for loading and/or unloading batteries from materials handling vehicles comprising:
a materials handling vehicle comprising a battery compartment;
a battery to be loaded into or unloaded from said battery compartment;
a battery transfer apparatus comprising:
a mobile unit for transporting said battery, said mobile unit comprising:
load handling structure for temporarily supporting said battery, said load handling structure comprising at least one roller that is used to roll said battery into or out of said battery compartment of said materials handling vehicle on said at least one roller;
an extractor assembly that can be rotated forward and backward to transfer said battery into or out of a materials handling vehicle; and
a locking assembly for preventing said extractor assembly from being rotated unless said mobile unit is secured to a materials handling vehicle; and
a battery stand comprising a top wall and support structure, said top wall including at least one opening and said support structure adapted to engage a surface upon which said battery stand is placed so as to support said battery stand on the surface; and
wherein said battery stand is adapted to be engaged by said mobile unit during a transfer of said battery into or out of said materials handling vehicle by inserting said at least one roller up through said at least one opening in said top wall of said battery stand such that said at least one roller can engage said battery through said at least one opening, and wherein said battery stand is capable of storing said battery while said battery is out of said materials handling vehicle when said battery stand is disengaged from said load handling structure.

18. The system according to claim 17, wherein said mobile unit comprises a handle structure for steering said mobile unit.

19. The system according to claim 17, wherein said mobile unit comprises a hook structure for engaging and securing said battery during battery transfer operations.

20. The system according to claim 19, wherein said battery comprises a bracket that is engaged by said hook structure to secure said battery to said battery transfer apparatus.

21. The system according to claim 20, wherein said mobile unit further comprises a latch for actuating said hook structure such that said hook structure is capable of engaging and securing said bracket of said battery during battery transfer operations.

22. The system according to claim 21, wherein said latch is also used for actuating said hook structure such that said hook structure is capable of releasing said bracket of said battery after battery transfer operations.

23. The system according to claim 19, wherein said hook structure is coupled to said extractor assembly that can be rotated forward to allow said hook structure to engage and secure a battery for a battery transfer operation, wherein said extractor assembly can be rotated backwards after said hook structure is engaged and secured to said battery to unload said battery out of a materials handling vehicle.

24. The system according to claim 17, wherein said mobile unit comprises structure for raising said at least one roller up through said at least one opening in said battery stand.

25. The system according to claim 24, wherein said mobile unit comprises securing structure to secure said mobile unit to said materials handling vehicle during battery transfer operations.

26. The system according to claim 25, wherein said materials handling vehicle includes a support bar that is engaged by said securing structure so as to secure said mobile unit to said materials handling vehicle during battery transfer operations.

27. The system according to claim 26, wherein said structure for raising said at least one roller is used to cause said securing structure to engage said support bar for a battery transfer operation and to cause said securing structure to disengage said support bar after a battery transfer operation.

28. The system according to claim 27, wherein said securing structure engages said support bar when said at least one roller is raised for a battery transfer operation and said securing structure disengages said support bar when said at least one roller is lowered after a battery transfer operation.

29. The system according to claim 28, wherein said structure for raising said at least one roller is located on the opposite side of said mobile unit than said materials handling vehicle when said battery transfer apparatus is properly positioned for a battery transfer operation.

30. The system according to claim 17, wherein said at least one roller comprises two sets of rollers and said battery stand comprises two elongated openings that receive corresponding ones of said two sets of rollers of said load handling structure.

31. The system according to claim 17, wherein said at least one roller comprises a plurality of rollers and said battery stand comprises a plurality of openings, each opening receiving a corresponding one of said plurality of rollers of said load handling structure.

32. The system according to claim 17, wherein said battery stand comprises an alignment aid for properly aligning said battery transfer apparatus with said materials handling vehicle for battery transfer operations.

33. The system according to claim 17, wherein said battery compartment is accessible from a side of said materials handling vehicle.

34. A method for loading or unloading a battery from a materials handling vehicle comprising:

positioning a battery transfer apparatus adjacent to a battery compartment of the materials handling vehicle, the battery transfer apparatus comprising:

a mobile unit for temporarily supporting and transporting a battery that is to be transferred into or out of the materials handling vehicle, the mobile unit comprising:

load handling structure for supporting the battery, the load handling structure comprising at least one roller that is used to roll the battery into or out of the materials handling vehicle on the at least one roller;

an extractor assembly that can be rotated forward and backward to transfer said battery into or out of a materials handling vehicle; and a locking assembly for preventing said extractor assembly from being rotated unless said mobile unit is secured to a materials handling vehicle; and a battery stand comprising a top wall and support structure, the top wall including at least one opening and the support structure adapted to engage a surface upon which the battery stand is placed so as to support the battery stand on the surface;

raising the load handling structure such that the at least one roller is raised up through the at least one opening in the top wall of the battery stand and such that the at least one roller can engage the battery through the at least one opening; and moving the battery into or out of the materials handling vehicle by sliding the battery on the at least one roller.

35. The method according to claim 34, wherein the load handling structure is raised until the at least one roller is at a proper height to move the battery into or out of the battery compartment.

36. The method according to claim 34, further comprising securing the battery to the battery transfer apparatus before it is moved into or out of the materials handling vehicle.

37. The method according to claim 34, wherein raising the at least one roller is accomplished by an operator engaging structure on the mobile unit.

* * * * *